Feb. 15, 1966  F. M. BIRD ETAL  3,234,932
RESPIRATOR

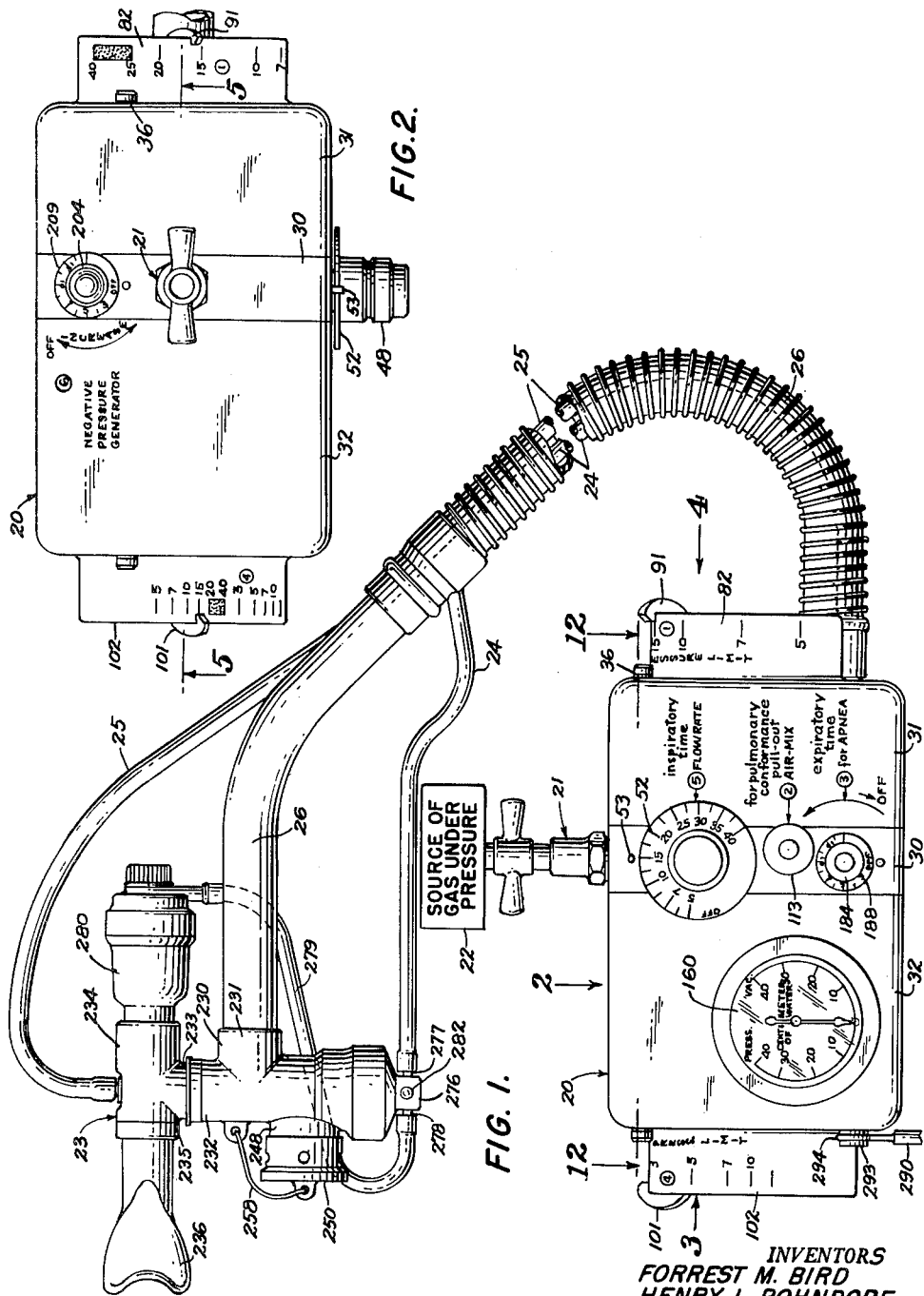

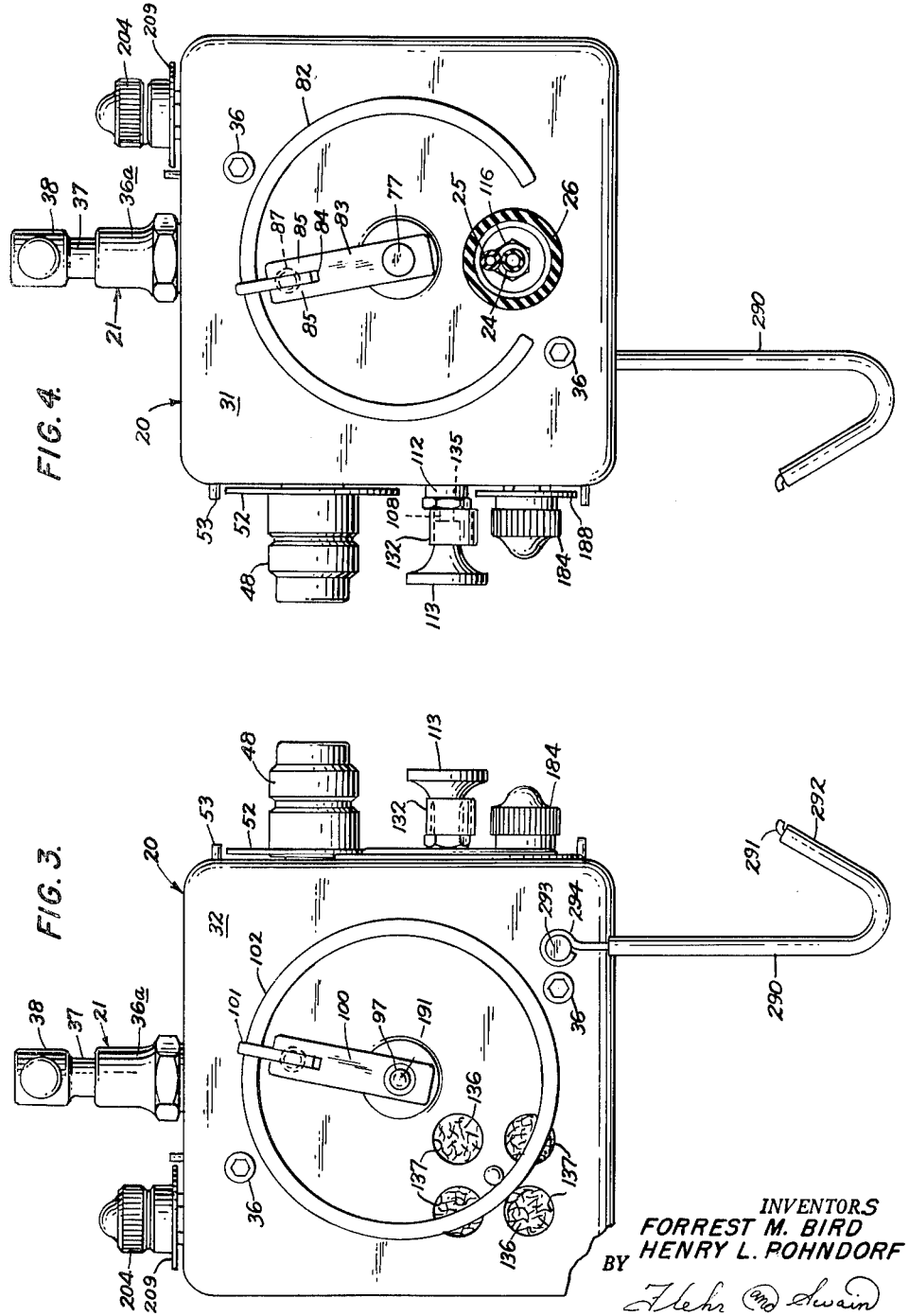

Original Filed Sept. 19, 1960  11 Sheets-Sheet 3

INVENTORS
FORREST M. BIRD
BY HENRY L. POHNDORF

ATTORNEY

Feb. 15, 1966   F. M. BIRD ETAL   3,234,932
RESPIRATOR
Original Filed Sept. 19, 1960   11 Sheets-Sheet 4
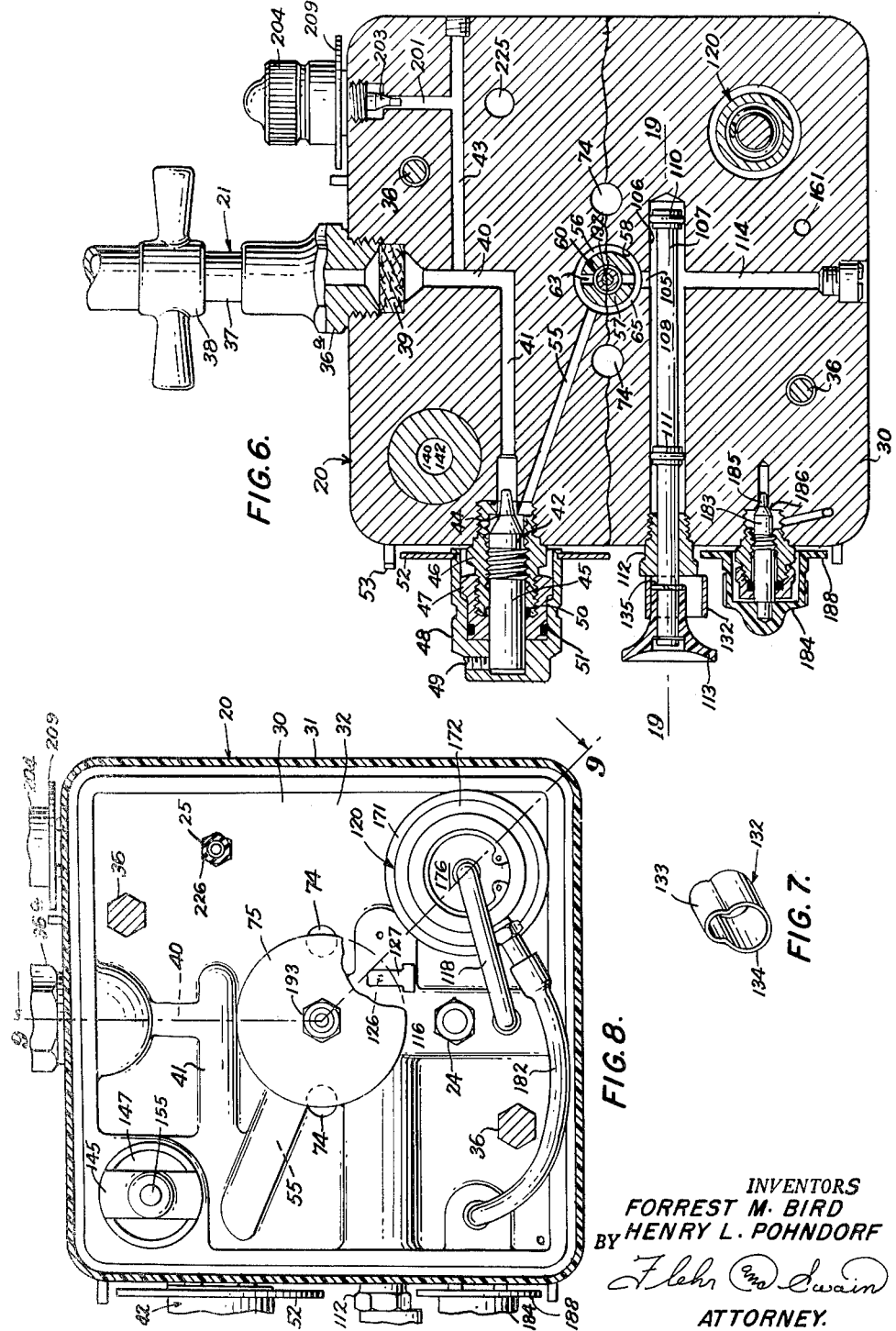
INVENTORS
FORREST M. BIRD
BY HENRY L. POHNDORF
ATTORNEY.

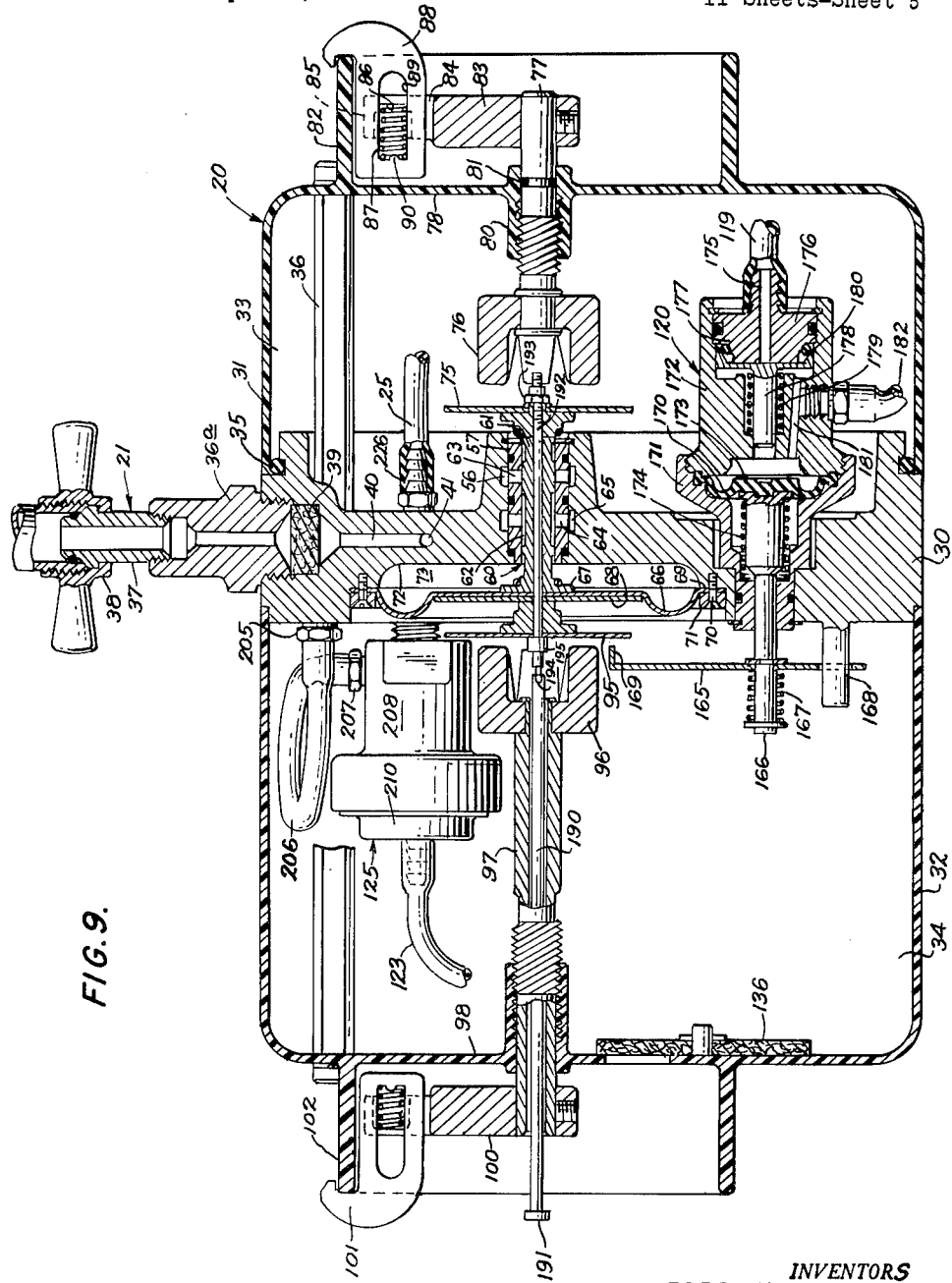

Feb. 15, 1966  F. M. BIRD ETAL  3,234,932
RESPIRATOR
Original Filed Sept. 19, 1960  11 Sheets-Sheet 6
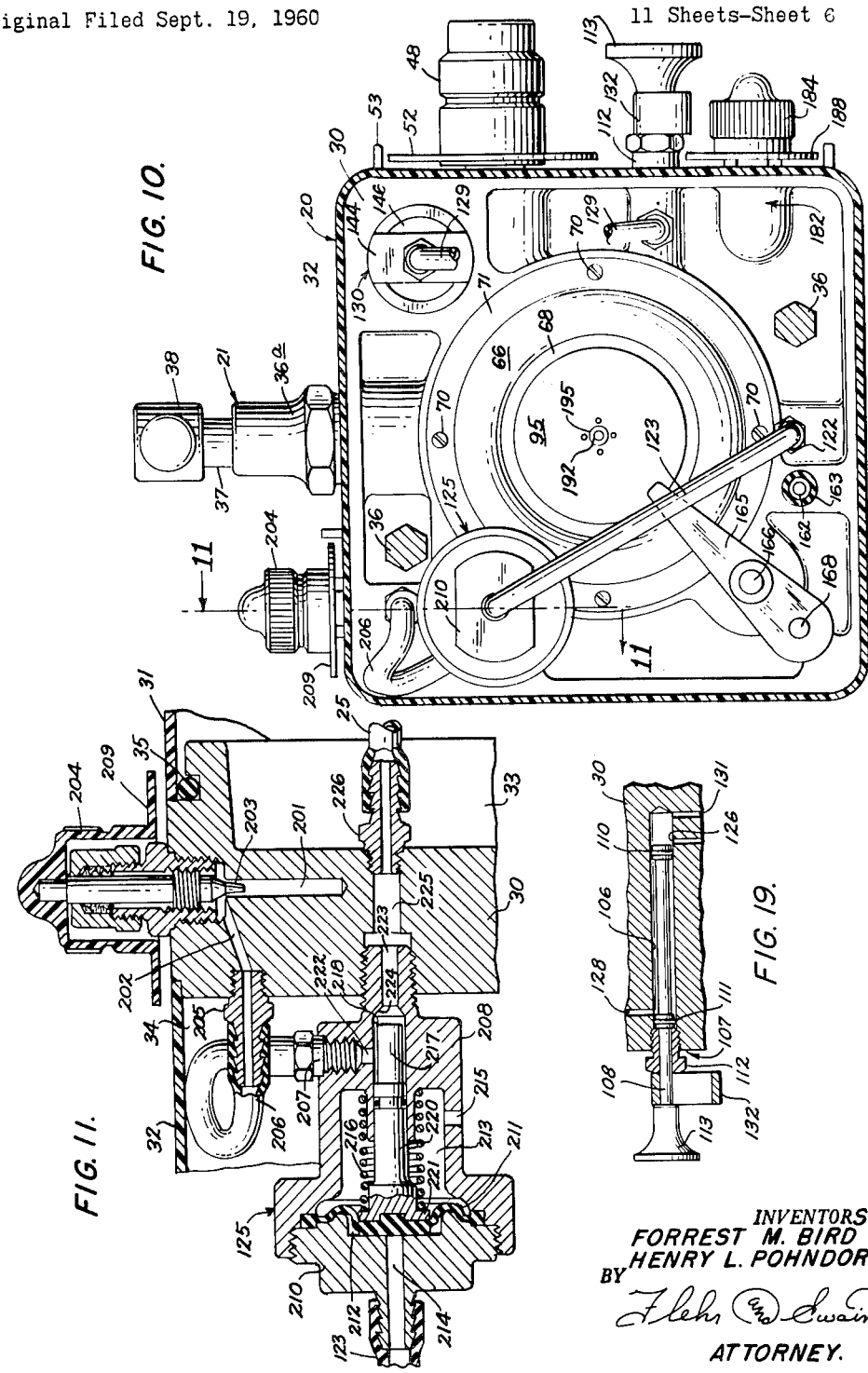
INVENTORS
FORREST M. BIRD
HENRY L. POHNDORF
BY
*Flehr and Swain*
ATTORNEY.

INVENTORS
FORREST M. BIRD
HENRY L. POHNDORF
BY
ATTORNEY

Feb. 15, 1966    F. M. BIRD ETAL    3,234,932
RESPIRATOR
Original Filed Sept. 19, 1960    11 Sheets-Sheet 8
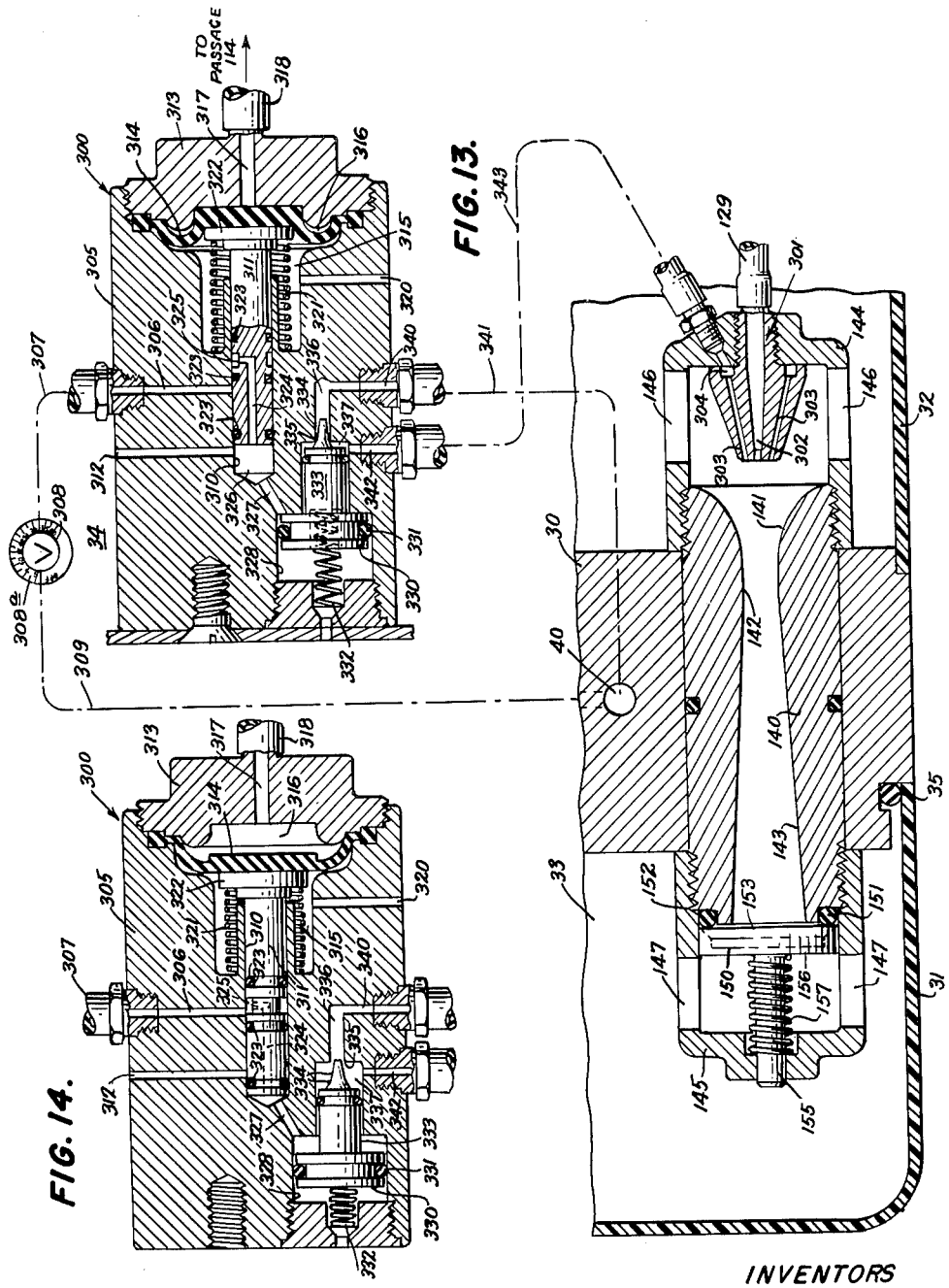
INVENTORS
FORREST M. BIRD
HENRY L. POHNDORF
BY
ATTORNEY.

Feb. 15, 1966   F. M. BIRD ETAL   3,234,932
RESPIRATOR
Original Filed Sept. 19, 1960   11 Sheets-Sheet 9

INVENTORS
FORREST M. BIRD
BY HENRY L. POHNDORF

ATTORNEY.

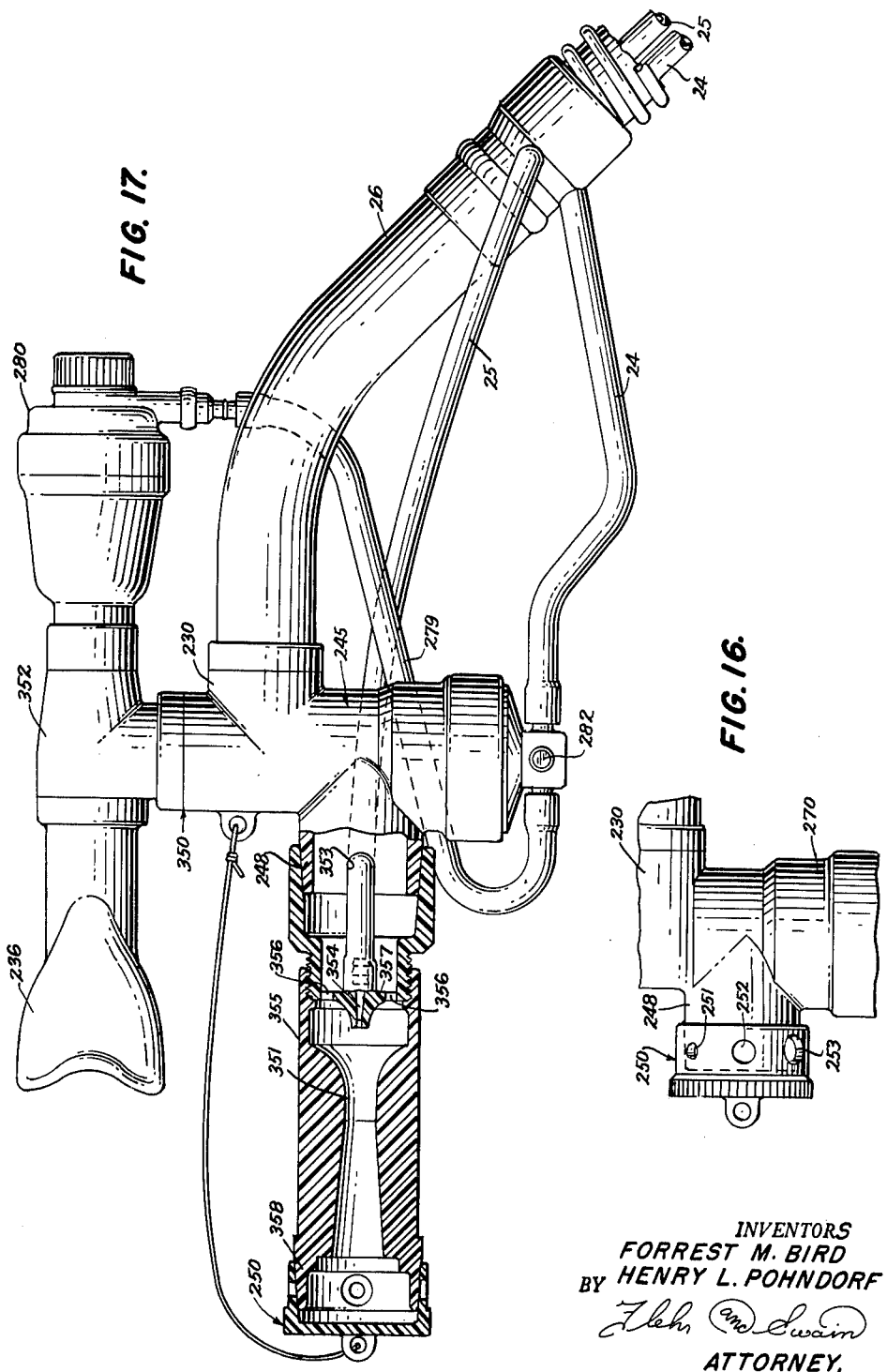
INVENTORS
FORREST M. BIRD
HENRY L. POHNDORF
ATTORNEY.

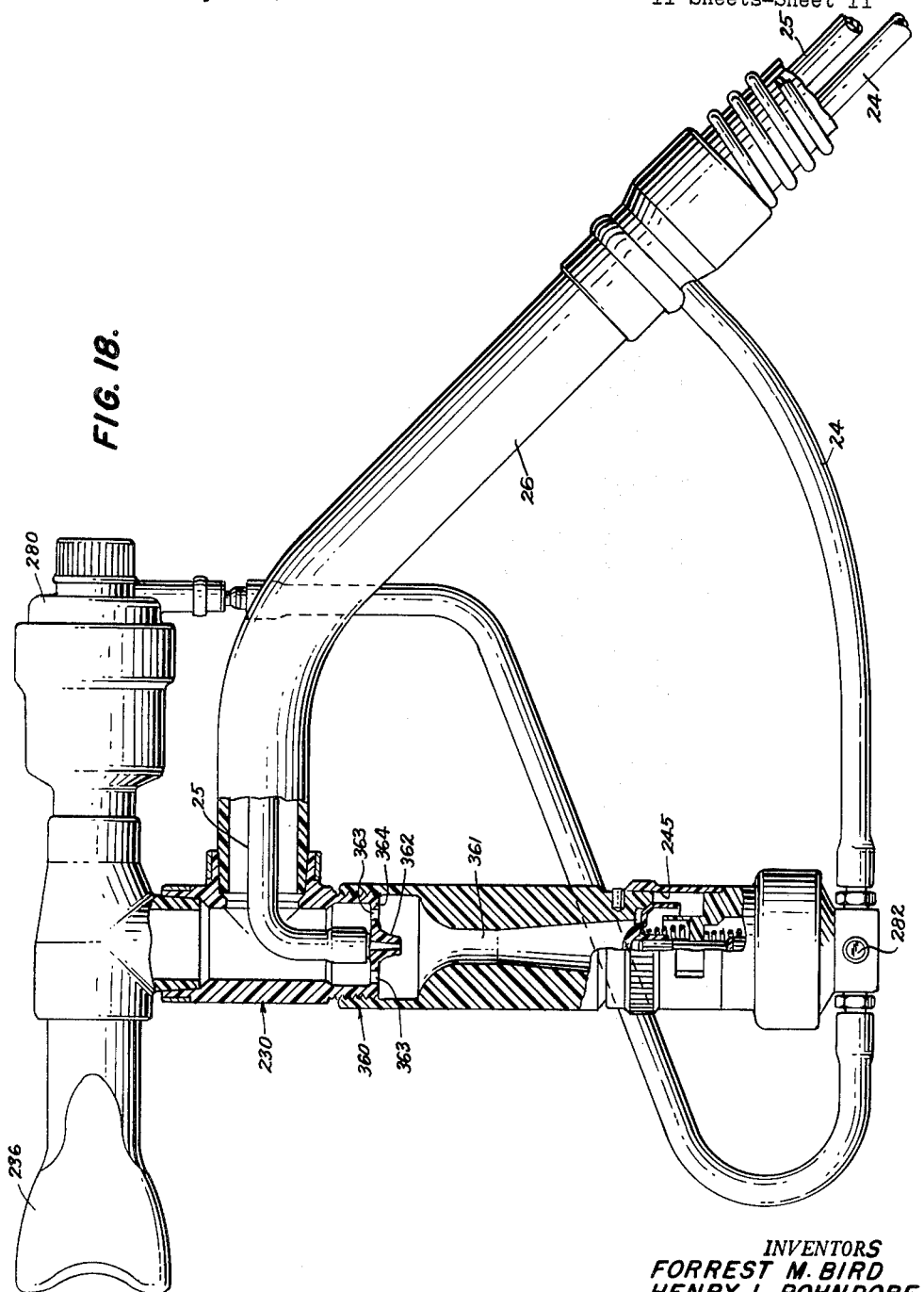

United States Patent Office 3,234,932
Patented Feb. 15, 1966

3,234,932
RESPIRATOR
Forrest M. Bird, Airport Box 970, Palm Springs, Calif., and Henry L. Pohndorf, 1227 Brewster Drive, El Cerrito 7, Calif.
Original application Sept. 19, 1960, Ser. No. 57,062. Divided and this application Feb. 4, 1963, Ser. No. 270,483
12 Claims. (Cl. 128—29)

This application is a division of application Serial Number 57,062, filed September 19, 1960.

This invention relates to an improved fluid control device. More particularly, it relates to an improved respirator system.

Many of the problems that have beset the respirator art were solved by the respirator disclosed and claimed in our co-pending application Serial No. 715,321, filed February 14, 1958, now Patent 3,068,856. The present invention utilizes that respirator and presents several improvements and additions to it.

One very important problem solved by this invention is how to prevent the patient from rebreathing a substantial amount of his exhaled air. In the present invention a novel venturi arrangement scavenges out the exhaled air. Moreover, a novel pneumatic switch arrangement insures that the scavenging gas will flow only during the negative exhalation phase of the cycle. Moreover, the scavenging gas is (in a preferred embodiment) used to aid in opening the exhalation valve.

An improved exhalation valve is another important feature of the invention. It is made in a new structure that prevents sticking, prevents contamination, enables rapid disassembly for cleaning, enables substantially foolproof and rapid re-assembly, and enables disassembly and re-assembly from one end. Special features afford protection to the valve and prevent foreign matter from affecting its operation.

As a result of the structural organization of this invention, the respirator can be used for numerous types of treatments not heretofore possible. Some of these are mentioned herein, as examples of the many uses of this important invention. Such versatility and new uses are among the most important objects of the invention.

Other objects and advantages of the invention will appear from the following description of some preferred embodiments thereof.

In the drawings:

FIG. 1 is a view in elevation of a respirator embodying the principles of this invention, having a control assembly, shown in front elevation, connected to a breathing head assembly, shown in side elevation.

FIG. 2 is a top plan view of the control assembly, looking at FIG. 1 in the direction of the arrow 2.

FIG. 3 is an enlarged view in end elevation of the control assembly, looking at FIG. 1 in the direction of the arrow 3.

FIG. 4 is a view, on the same scale as FIG. 3, in end elevation of the control assembly, looking at FIG. 1 in the direction of the arrow 4.

FIG. 6 is a view in vertical cross section taken along the line 6—6 in FIG. 5. The air-mix knob is shown in its "in" position for delivery of pure oxygen.

FIG. 7 is a perspective view of the safety washer used in connection with the air-mix rod.

FIG. 8 is a view in section taken along the line 8—8 in FIG. 5.

FIG. 9 is a view in section taken along the line 9—9 in FIG. 8.

FIG. 10 is a view in section taken along the line 10—10 in FIG. 5.

FIG. 11 is a fragmentary enlarged view in section taken along the line 11—11 in FIG. 10.

FIG. 13 is a still further enlarged fragmentary view in section of a modified form of venturi in the control assembly, connected to an acceleration valve, the latter being shown in its closed position.

FIG. 14 is a view in section of the acceleration valve of FIG. 13, shown in open position.

FIG. 16 is a view of the retarder used in the breather head assembly of FIGS. 1 and 15.

FIG. 17 is a view in side elevation, partly in section, of a modified form of breather head assembly.

FIG. 18 is a view in side elevation, partly in section, of another modified form of breather head assembly.

FIG. 19 is a view, partly in section, of an air-mix switch shown in FIG. 6.

Figure 5:
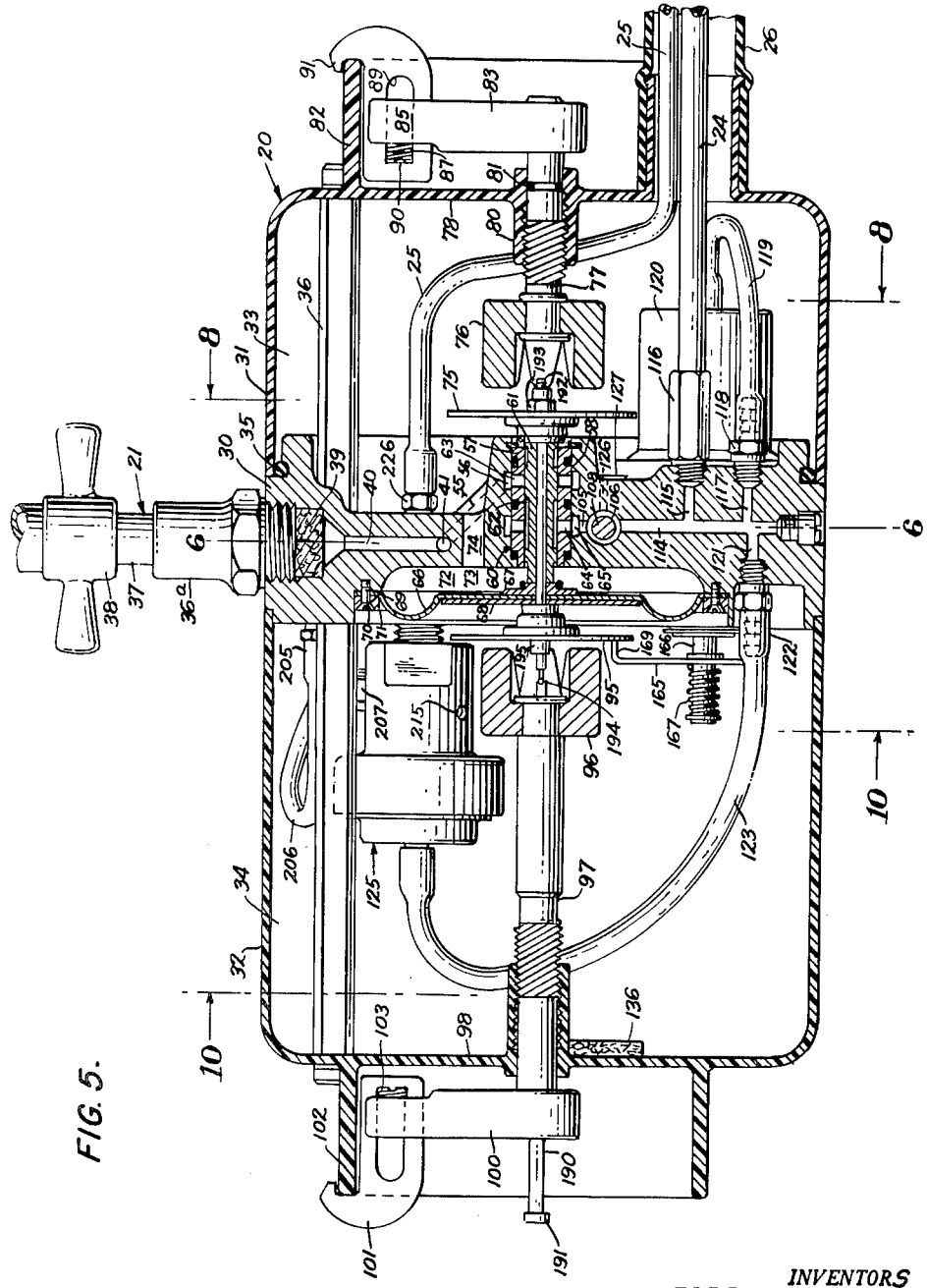
FIG. 5 is a further enlarged view in section taken along the line 5—5 in FIG. 2, showing the main respirator flow switch or valve in its "off" position, where no gas is passing through the central valve.

The complete respirator or ventilator unit of this invention (FIG. 1) comprises a control assembly 20 having an inlet assembly 21 connected to a source 22 of gas (normally air or oxygen) under pressure, the control assembly 20 being connected to a breathing head assembly 23 by two small conduits 24 and 25 and one larger conduit 26, which encloses the conduits 24 and 25 over most of their length.

*The control assembly 20 and its inlet (FIGS. 1–12)*

The pneumatic-magnetic mechanical ventilator or control assembly 20 is basically like that of our co-pending application Serial No. 715,321 filed February 14, 1958, but there are some important additions and changes. Typically, the complete assembly 20 weighs only about 6 pounds and is about 5" x 5" x 8". It comprises a main body 30 to which are secured case members 31 and 32, respectively defining a pressure compartment or reservoir 33 (right side of FIGS. 1, 5, 9 and 12) and an atmospheric-pressure compartment 34 (left side of FIGS. 1, 5, 9 and 12). The case 31 is secured to the body 30 in a leak-tight fit by means of a resilient gasket 35. Such a fit is not necessary with the case 32. The body 30 and case members 31 and 32 are bored, recessed, and shaped as needed to provide passages for gas and supports for the other parts and together may be considered as comprising a housing, as for the valve 60 (see below). A pair of longitudinally extending rods 36 help hold the body 30 and case members 31 and 32 together.

The inlet assembly 21 (see FIGS. 5 and 9) preferably includes an adapter 36a that is threaded into the body 30 and receives a nipple 37. The nipple 37 holds a wing nut 38 that may be secured to the outlet of a pressure-reducing regulator or to an on-off valve of a hospital manifold system. Whatever the pressure of the original source 22 of high-pressure gas, it is preferably regulated to the order of 50 p.s.i., though the control assembly 20 can accommodate widely varying pressures, such as from 25 to 100 p.s.i. Preferably, a gas filter 39 is positioned in the body 30 adjacent the end of the adapter 36a to remove foreign material from the gas.

An inlet passage 40 leads radially in from the filter 39 for a short distance and connects (FIG. 6) to an outwardly extending passage 41 that conducts the incoming gas to a needle valve 42. The passage 40 is also connected to a passage 43 whose purpose will be explained later. The needle valve 42 controls the flow rate of gas in the respirator, so that any desired flow may be obtained over a range greater than from 1 liter per minute to 1000 l.p.m. The valve 42 has some significant differences from the needle valve shown in application Serial No. 715,321, now Patent No. 3,068,856. As shown in FIG. 6, it preferably comprises a seat 44, formed as a shoulder in an adapter or housing 46, and a movable valve stem 45 adapted to close against the seat 44 to shut off flow completely and to be moved away therefrom for various flow rates up to a maximum supplied by the source 22. The stem 45 is threaded to move in the interiorly and exteriorly threaded housing 46 that is secured to the body 30. Around the housing 46 is secured a stationary sleeve 47, and around the sleeve 47 a cap-like handle 48 is rotatably mounted. The handle 48 is secured to a projecting portion of the stem 45 by a set-screw 49. Leakage around the stem 45 is prevented by a packing ring 50 held on the housing 46 by the sleeve 47, which serves also as a packing nut.

Additional protection against leakage is provided by a gasket ring or packing 51 secured in a recess in the sleeve 47, between the sleeve 47 and the cap-like handle 48, which also affords dust protection. The handle 48 also carries a flat ring 52, which is calibrated to accord with calibrations for the magnets 76 and 96, and controls 184 and 204, as will be explained later. An indicator pin 53 is used to indicate the actual or relative flow rate produced by each position of the needle valve 42 (see FIGS. 1–4). Also, flat ring calibrations and indicator pins are used to show relative flow positions of the needle valves 183 and 203, described later. The valve 42 regulates the time it takes to fill the lungs properly when the acceleration switch of FIG. 13 is not set to function. Considering the patient's comfort and his ability to comply, the slowest rate should be selected. The valve 42 enables accurate control to be obtained readily. Thereby proper pulmonary conformance is obtained. Flow rates for all values within the range of 0 to 80 liters per minute are readily obtained, and higher rates are available.

From the valve 42 a generally radially inwardly-extending passage 55 (FIG. 6) leads in to an annular chamber 56 that surrounds a stationary valve sleeve 57, which is positioned in a bore 58 through the body 30. At that point the gas flow is stopped or passed, according to the position of a stem or main valve 60 which, together with the sleeve 57, comprises the control flow switch mechanism.

(When the negative phase occurs during an assisted respiratory pattern, the valve 203 partially regulates the expiratory phase duration, as does the magnet 96. When a controlled respiratory pattern obtains during the negative phase, the expiratory phase duration is controlled by the position of the needle valve 185, while the magnet 96 is adjusted to hold the respirator switch 60 in off position until the arm 165 (FIG. 19) moves switch 60.)

*The main valve 60 (see FIGS. 5 and 9)*

The main valve 60 is a sliding valve mounted in the housing comprising the elements 30, 31 and 32, and comprises a shaft member 61 (differing from that in application Serial No. 715,321, now Patent No. 3,068,856 by being tubular, for a reason explained later) with a spool-like recess 62. The outer periphery of the shaft 61 has a very close-tolerance fit in a smooth bore through the valve sleeve 57. The sleeve 57 has a series of radial passages 63 connecting with the annular chamber 56 and a second series of radial passages 64 axially spaced away from the passages 63 and communicating with an annular chamber 65 in the body 30. The spool recess 62 is long enough to bridge the passages 63 and 64 when the valve 60 is in open position, and short enough so that the passages 63 are cut off from the passages 64 when the valve 60 is in its closed position (FIG. 5).

Both the tubular shaft 61 and sleeve 57 may be made from metal, but preferably they are made from alumina ceramic with carefully dimensioned proportions to hold wear to a minimum, since the shaft 61 slides many times a minute in the sleeve 57. Generally, their structure and the sealing means for them are the same as in application Serial No. 715,321 now Patent No. 3,068,856 except for the tubular nature of the shaft 61, so the features that are unchanged need not be described here. Its clearance in the bore is only about 0.0002, and it is self-honing. Substantially friction-free weightlessness is achieved by the sapphire-hard ceramic valve 60 being, for practical purposes, magnetically suspended in air, as will be seen.

*The main control of the main valve 60 (FIGS. 4–6, 8, 9, and 12)*

A diaphragm 66 is mounted with a leak-tight fit between plates 67 and 68 at one end of the shaft 61 (the left end as seen in FIGS. 5 and 9). The body 30 is recessed from one side to provide a shelf 69 on which the rim of the diaphragm 66 is secured by screws 70 and a clamp ring 71. A concentric recess 72 with a rounded outer periphery is also provided in the body 30, and the central part of the diaphragm 66 is spaced away therefrom to provide a small chamber 73. The chamber 73 is connected to and operationally forms part of the high pressure compartment 33, because two large passages 74 extend through the body 30, so the gas in the compartment 33 urges the diaphragm 66 to the left in FIGS. 5 and 9, while the atmospheric pressure in the chamber 34 urges the diaphragm 66 to the right.

On the right end of the shaft 61 is mounted an attraction plate or armature 75 made of soft iron or other ferromagnetic metal and sensitive to magnetic attraction. Such attraction may be provided for the plate 75 by a main magnet 76, which preferably is mounted at one end of a threaded shaft 77 of a nonmagnetic material (e.g. aluminum). Powerful magnets 76 with a holding power of about ten lb. of dead weight are preferred. The shaft 77 extends out through an end wall 78 of the case 31 and is exteriorly threaded to engage an interiorly threaded support member 80, leakage being prevented by an O-ring 81.

The case end wall 78 is provided with a projecting annular segment 82 that bears a series of calibrations related directly to those on the ring 52 and in the same values. A radially extending arm or handle 83 is secured to the outer end of the shaft 77 and has a groove 84 extending in from its outer end between projecting portions 85. The portions 85 have their rear sides recessed to provide a seat 86 for a spring 87 (FIG. 9). An index member 88 is inserted in the groove 84 and has a slot 89 accommodating and providing the other seat 90 for the spring 87. The spring 87 acts to provide a friction brake causing a hooked portion 91 of the member 88 to bear against the segment 82, not only to serve (as it does), as the index member for the calibrations there, but also to lock the shaft 77 against unintentional movement. The shaft 77 is readily moved, when movement is intended, by pulling out the index member 90 a slight amount, against the pressure of the spring 87 and then turning the arm 83.

Since the pressure in the pressure compartment 33 is, when the valve 60 is open, greater than that in the atmospheric chamber 34, the gas pressure tends to force the diaphragm 66 to the left (FIGS. 5 and 9) and therefore to close the valve 60. However, the attraction of the main magnet 76 for the attraction plate 75 tends to pull the shaft 61 to the right and open the valve 60. By turning the handle 83, the main magnet 76 may be moved nearer to or farther from the plate 75 so as to achieve any desired relation between these opposed forces.

The shaft 61 does not move far between the open and closed positions of the valve 60—usually only about ⅛–¼"—but the peculiar nature of magnetic force provides a most unusual action that is very important, this feature having been explained in detail in application Serial No. 715,321, now Patent No. 3,068,856. To illustrate the point, suppose that the pressure against the two sides of the diaphragm 66 is at a certain value, say atmospheric pressure, holding it in equilibrium. Then suppose that the magnet 76 is moved (by handle 83) to a position where, when the valve 60 is closed, the magnetic force is almost but not quite sufficient to overcome the pressure holding the valve 60 closed (e.g., the magnetic force of the magnet 96 on plate 95, as explained later). Now if a patient provides the slightest drain of gas from the reservoir 33 by beginning to inhale, the pressure in the reservoir 33 drops. Even so slight a drop as 0.001 cm. of water can be made to actuate this switch-type valve. For once the pressure drops, the diaphragm 66 is not in equilibrium, and the force of the magnet 76 will attract the plate 75 and open the valve 60. But the action is not simple like that of two opposed diaphragms, for the force of attraction of the magnet 76 for the plate 75 varies inversely with the third power of the distance between them. So the movement is a snap action like a switch. Actually, the plate 75 is never permitted to move into contact with the magnet 76, some space always being maintained, but it will move with a snap action all the same.

As will be explained soon, the effect of opening the valve 60 is to send gas under pressure into the reservoir 33. So long as the patient breathes at the flow rate set in the needle valve 42, for that patient, gas continues to flow to his lungs and the pressure in the reservoir 33 does not increase, or may increase gradually. However, when the lungs are filled, gas pressure builds up in the reservoir 33 and when it is enough to barely overcome the magnetic force, it moves the shaft 61 to the left. Any movement decreases the magnetic force by the third power of the distance moved; so the action back is also a snap action. Thus the flow-switch type of valve 60 is either on or off and is substantially instantaneous. Because of that, the effort to be supplied by the patient can be infinitesimal and the timing rate can be very rapid—as much as or more than 500 cycles per minute. And the patient effort required to switch the respirator on can be increased when the patient is able to exercise his own diaphragm to give him exactly the amount of help he needs, no more and no less. I.e., for a polio victim the flick of his tongue or cheek will open the main valve 60.

It is important to hold in mind the fact that the diaphragm 66 is opposed by the magnetic force inversely proportional to the third power of the distance between the attraction plate 75 and the magnet 76, as distinct from a spring opposing a diaphragm with a force *linearly* and directly proportional to the spring compression. It is also important to note that the valve 60 is both flow-sensitive and pressure sensitive, for either an increase in pressure in the compartment 33 or a stoppage or reduction of flow (which results in increased pressure on the diaphragm 66) will turn off the valve. Moving the handle 83 increases or decreases the inspiratory pressure limit at which the valve 60 moves to its off position. The unit considered so far (i.e., without the magnet 96) would automatically switch on and off at a speed determined by the distance between the armature 75 and the magnet 76.

The position of the magnet 76 also determines the pressure at which the breathing gas is delivered to the patient. Thus, when the handle 83 is set so that the number 91 registers at a calibration of "15," that means that the gas is delivered to the patient at approximately 15 centimeters of water, exact adjustment being obtained by observing the gauge 160. The limits for most uses are from 0 to 60 cm. of water, these positive breathing pressures being independent of the flow rate and with or without the air dilutor at the venturi 130 described later. For cardiac resuscitation, the respirator is set to obtain 160–200 cm. of water positive pressure limit, using a reference line of zero at ambient or atmospheric pressure.

*The sensitivity magnet 96 (FIGS. 3, 5, 9, 10 and 12)*

To prevent this automatic switching when it is not desired or to regulate the timing cycle if it is desired, the shaft 61 is provided at its left end with an armature or attraction plate 95 of the same general type as the plate 75, and a sensitivity magnet assembly 96 is provided in the compartment 34, acting on the attraction plate or armature 95. The magnet 96 preferably is mounted on a hollow exteriorly threaded shaft 97 having twice as many threads per inch as the shaft 77, so that it moves exactly twice as far for the same turn. The magnet 96 may be identical in size, shape, and attraction to the magnet 76. The magnet 96 *holds* the valve 60 closed during exhalation and periods of rest between breathing excursions. Inhaling or sucking by the patient breaks the hold of the magnet 96 on the valve 60. The shaft 97 extends out through an end wall 98 of the case 32, where a handle 100, index number 101, and calibrated ring 102 generally like those for the shaft 77 are provided, as well as a braking spring 103. The ring 102 is calibrated to match the calibrations on the ring 82 and should generally be set at the same value. Operation is substantially like that of the magnet 76, except that the magnet 96 moves twice as far for the same amount of turn by its shaft 97 as does the magnet 76 when its shaft 77 is turned. The limits here are usually in the range of 0 to —15 cm. of water.

Preferably, a two-to-one ratio is maintained between the movement-per-turn of the shaft 97 and that of the shaft 77. Preferably, the shaft 77 has a four-lead four-pitch screw, giving it an advance of one inch in four complete turns, while the shaft 97 has an eight-lead two-pitch screw, giving it an advance of one inch in two complete turns.

When the magnet 96 is close to the armature 95, it has more holding power, and it takes much more effort on the part of the person breathing to move the valve 60 to its "on" position than when the magnet 96 is distant from the armature 95. So the sensitivity magnet determines the patient effort. For example, in one embodiment, it was found that when the magnet 96 was in its innermost position (actual contact is never made) the patient effort was about 3 cm. of water below ambient atmospheric pressure. When it is withdrawn to a certain location, easily found, a zero point is reached where it requires no patient sucking effort to turn the valve 60 on. From this point in, is the *sensitivity control,* where any desired amount of patient effort from zero up to the maximum (such as 3 cm. or more) can be obtained. The least triggering effort can be obtained through individual sensitivity adjustment.

From the zero point out, the magnet 96 functions as a *magnetic timer*. A magnetic pull is still exerted on the armature 95 and the pull is sufficient to delay the automatic opening of the valve 60 by the magnet 76 for a finite time. The time decreases as the magnet 96 is moved farther and farther away from the armature 95.

Under sensitivity control the patient times the valve 60 on his own at all times and at the effort appropriate to him. Even when the switch valve 60 is timed automatically the patient may still have some control. For example, if it is set for ten times per minute, the patient will still be able to switch the valve 60 on, so long as his own breathing rate is faster than 10 times per minute, while if he falls below that level the valve 60 times the patient. This flexibility is noteworthy. The timing speed may vary over a very wide range, between less than one cycle per hour and more than 500 cycles per minute.

The patient effort may really be minimal. At some settings of the magnet 96 a movement of the tongue or a flexure of the cheek is enough to switch the respirator on. The on-off sensitivity is normally only 0.01 centimeter of water. When calibrating the ring 102 for inspiratory sensitivity effort, 1.0 cm. of water effort is set for numbers corresponding to those on the segment 82. The patient may index lower or higher sensitivity for each positive pressure limit on the segment 82. As the magnet 96 is moved closer to the attraction plate 95, the index number 101 moves on the ring 102 into another range called "negative pressure limit" and the ring 102 is calibrated in centimeters of water pressure below ambient, much as the segment 82 is calibrated in centimeters of water pressure above ambient. Actual negative pressures are recorded on a gauge 160. A ring calibration on needle flow valve 203 will have numbers corresponding to the negative range number on the ring 102, in a fashion similar to those on the flow valve 42 and the positive calibrations on the segment 82.

The fluid flow from the switch-type valve 60 (FIGS. 5–10)

So far the flow into the valve 60 and the operation and control of the valve 60 have been explained. When the valve 60 is in its closed position, the flow is cut off at the annular chamber 56 and radial passages 63 by the spool shaft 61. When the valve 60 is open, the compressed gas flows from the radial passages 63 by way of the recess 62 to the radial passages 64 and the annular chamber 65. A passage 105 (FIGS. 5 and 6) leads from the chamber 65 into a bore 106 wherein is positioned an air-mix switch or two-position slide valve 107. The air-mix switch 107 comprises a shaft 108 with flanges whereon are mounted O-rings 110 and 111 that seal against gas passage between them and the bore 106. A shaft guide 112 is threaded into the body 30, and the switch 107 is provided with a handle or air-mix knob 113.

In both positions of the gas switch 107, the gas (normally pure oxygen) flows from the bore 106 into a passage 114 (FIG. 5). Thence it flows through a passage 115 and fitting 116 into the inner conduit 24 which leads to the breather head assembly 23, and its function will be explained later. For now it is sufficient to note that pure oxygen (unmixed with ambient air) is always supplied to the small conduit 24, when the device is used as a respirator.

Pure oxygen also passes from the passage 114 through a passage 117 and fitting 118 into a tube 119 that leads to the air timing unit 120 to be explained later; it also passes from the passage 114 through a passage 121, fitting 122 and tube 123 to a negative phase unit 125, also to be explained later.

However, most of the oxygen is controlled by the switch 107 to go on one of two alternate paths. When the shaft 108 is pushed in, as in FIG. 6, the gas flows from the bore 106 into a passage 126 and from there directly and undiluted to the high pressure compartment 33. On its entry to the chamber 33 from the passage 126, the gas has to flex one end of a leaf spring or harmonica reed 127, the other end of which is secured to the body 30. Flexure of the reed 127 helps maintain sufficient back pressure to ensure the supply of oxygen to the small conduit 24, the air timer 120, and the negative pressure unit 125, and also to an accelerator switch conduit 318, discussed later. It also diffuses the entering gas and keeps it from acting on the attraction plate 75 either pressure-wise or corrosively. It also balances the flow of pure oxygen relatively to the flow through a venturi 130, described below, as required by the calibration ring 52 for the needle valve 42. So when the gas switch 107 is pushed in and when the valve 60 is open, pure oxygen passes into and fills the reservoir 33 via the passage 126. From the reservoir 33 it passes freely into the large conduit 26 and to the breather head assembly 23. The reservoir 33 not only functions as a pressure chamber for the diaphragm 66 but also retains a supply of gas that can supply the instant peak demand of a patient as soon as he breathes and makes it possible to have a relatively low constant flow rate through the needle valve 42.

When the handle 113 is pulled out, the O-ring 110 blocks off the passage 126, and routes the oxygen through a passage 128 and tube 129 to a venturi 130 where the oxygen is diluted with and mixed with atmospheric air and then sent into the pressure compartment 33. A passage 131 vents the passage 106 to the chamber 33, so that the plunger 108 can move freely and not be restrained by the building up of a vacuum to the right of the O-ring 110.

In the past there has been some trouble because, when the handle 113 was intentionally pulled out by the doctor, nurses having a neatening instinct automatically and thoughtlessly pushed the handle 113 in, thereby changing the doctor's prescription. In the present invention this problem is solved by providing a novel latch washer 132, shown in FIG. 7 (as well as in FIGS. 3, 4, 6, and 10), having an outstepped portion 133 and a main portion 134. When the handle 113 is pulled out, this washer 132 slips down on the shaft 108, so that if the handle 113 is pushed in, a shoulder 135 on the handle 113 engages the washer 132, which thereafter prevents further movement of the shaft 108 or handle 113. Of course, if the doctor really intends to push the switch 107 in, he can do so by merely lifting the latch washer 132 as he does so.

Figure 12:
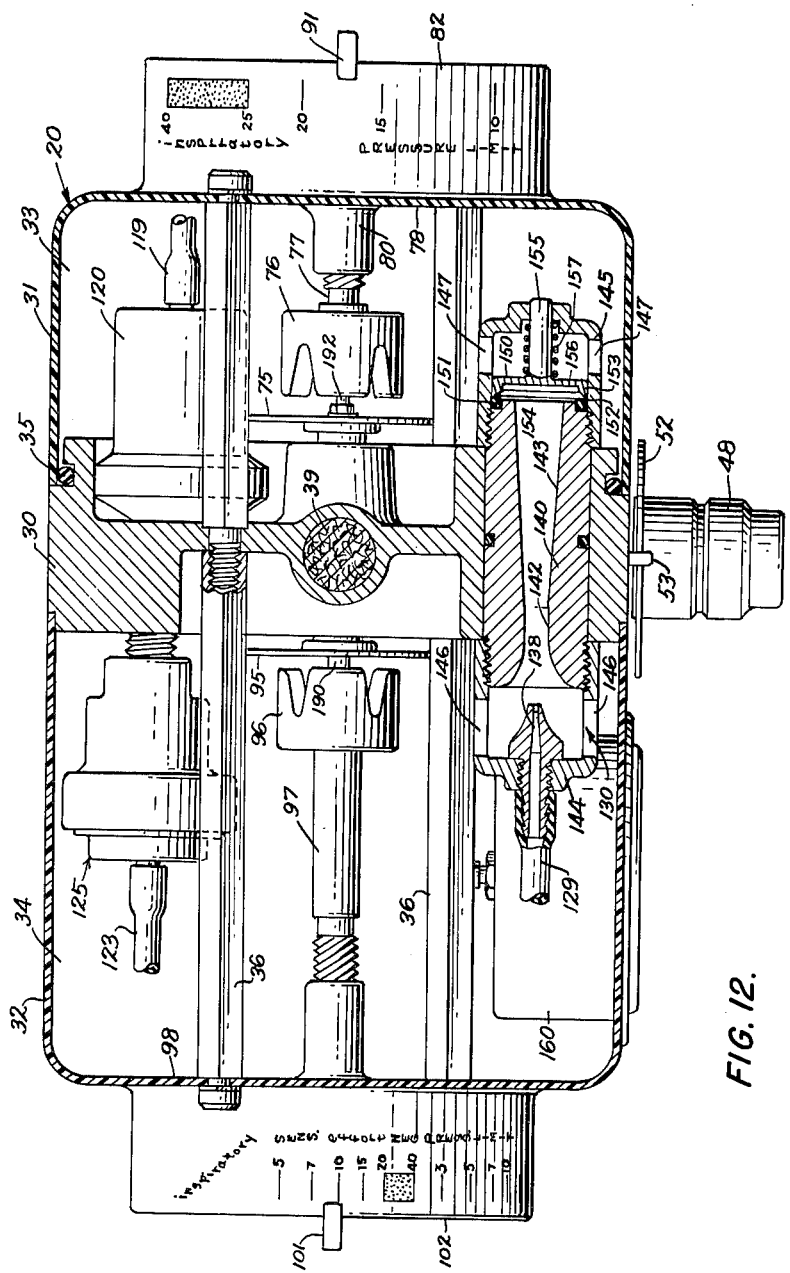
FIG. 12 is an enlarged view in section taken along the line 12—12 in FIG. 1.

The venturi 130 (FIG. 12)

The purpose of the venturi 130 is to dilute the oxygen with air for patients requiring oxygen enrichment but not pure oxygen and to give pulmonary conformance. Since air is approximately 20% oxygen, it can be enriched to supply a patient with 33⅓% oxygen by mixing one part of pure oxygen with five parts of atmospheric air. Air with 40% oxygen can similarly be obtained by a one to four dilution. To make sure that the air is clean, it is preferably taken into the atmospheric compartment 34 through a filter 136 (FIGS. 3 and 5) which may be porous metal or glass wool covering a plurality of air intake openings 137, four of which are shown by way of example. Physiologically, air exchange, proper alveolar ventilation, bronchial drainage and "blowing off" carbon dioxide, as well as simultaneous broncho dilation are important, not oxygen therapy, and therefore the air-mix is used 99% of the time and achieves better pulmonary conformance.

The high pressure oxygen in the tube 129 enters the venturi 130 through a jet 138 which preferably is small, such as results from a #75 drill. A venturi tube 140 preferably has an accurately made elliptical-in-cross-section inlet portion 141 leading into a neck 142 and has an elongated flared outlet 143. The tube 140 has exteriorly threaded ends and is locked in place by two cylindrical caps 144 and 145. The caps 144 and 145 have large openings 146 and 147 through their side walls; the openings 146 constitute the venturi's air inlet in the atmospheric chamber 34 while the openings 147 constitute the outlet opening in the pressure chamber 33. The cap 144 also supports the inlet fitting and jet 138.

The cap 145 supports a gate or check valve plug 150 for sliding movement toward and away from a seat comprising an O-ring 151 mounted in a recess 152, around the outer rim of the tube 140. The plug 150 has an annular beveled rim, 153, and a central flat forward surface 154, as well as a stem 155 and a rear annular flat surface 156. A spring 157 compressed between the surface 156 and the cap 245 normally holds the plug rim 153 seated against the O-ring 151. The flat forward surface 154 gives a rapid response to pressure in the venturi 130 to open the plug 150, and the flat rear surface 156 helps in a similar manner to cause its closing when the venturi flow ceases. The beveled rim portion 153 cups around the O-ring 151 because of its slope.

Note that the gate 150 is on the downstream side of the venturi 130, where much pressure is available and nothing is critical. This is in contrast to the sensitivity required on most venturis where the gate is on the inlet side. The cutoff valve 60 makes this structure feasible. Also, as in the pure oxygen against the reed 127, there is radial airflow, diffusion, and minimum turbulence.

The gate 150 also operates as a safety valve, functioning at a pull of only about 2 cm. $H_2O$ should the inspiratory demand exceed the rate of a constant inflow of gas as set at the valve 42, or if the operational gas supply fails, to send air to the patient.

Thus, the oxygen, diluted with air, once it comes through the venturi 130, enters the high pressure chamber 33 where it acts the same as the pure oxygen did from then on. In other words, it builds up pressure in the reservoir 33 against the diaphragm 66, and it passes through the large conduit 26 to the breathing head assembly 23.

*The gauge (FIGS. 1, 6, 10 and 12)*

In order that the operator may know the pressure in the breathing pressure chamber 33, a gauge 160 is provided (FIG. 1). A passage 161 (FIGS. 6, 10, and 12) leads through the body 30 from the reservoir 33 and is connected by a fitting 162 to a conduit 163 which leads to the gauge 160. Preferably, the gauge 160 is mounted in the case 32, because there is more room on it than on the case 31, although the gauge 160 could be mounted completely separately, if desired. Thus the pressure in the breathing pressure chamber 33 can be read at all times.

*The pneumatic timer 120 (FIGS. 5, 8, 9 and 12)*

A pneumatic timer 120 (which may also be termed as automatic timer, expiratory timer, or secondary timer), is provided primarily for anaesthesia applications, but may also be used wherever expiratory time should be controlled. It is used, for example, when the patient has lost consciousness or the ability to breathe voluntarily, or for the resuscitation of the newborn. Very precise timing of a minimum breathing rate is achieved by timer 120. Since it is fully described in co-pending application Serial No. 715,321 now Patent No. 3,068,856, it will be only briefly described here.

Referring first to FIGS. 5 and 10, there is an arm 165 in the chamber 34 mounted on a shaft 166 so that the arm 165 is parallel to the attraction plate 95, and the shaft 166 is parallel to the valve shaft 61. The arm 165 is mounted yieldably by means of a spring 167, and its parallel alignment is retained by a guide stud 168. An axially turned end 169 of the arm 165 is so arranged that it can strike the plate 95. If it does so, the little tap it gives is sufficient to start the shaft 61 moving to the right, and once that happens magnetic attraction, varying as it does inversely with the third power of the distance, will snap the valve 60 open. The pneumatic timer 120 acts by moving the arm 165 to the right at the desired time.

A diaphragm 170 (FIG. 9) has its periphery clamped between a timer body 171 and a cap 172. A diaphragm plate 173 is secured to the inner end of the shaft 166, and a spring 174 biases the diaphragm 170 toward the right and urges the shaft 166 in that same direction, by virtue of the spring's being compressed between the diaphragm plate 173 and the body 171. Thus the spring 174 always tends to urge the arm 165 toward the armature 95 and open the valve 60. When the valve 60 is open, gas passes from the downstream passage 114 through the passage 117, the fitting 118, and the tube 119 to an axial inlet fitting 175 of a stationary plug 176 that is mounted in the cap 172. This gas forces a plunger 177 away from the plug 176. This plunger 177 has a stem 178 that slides in a bore through the cap 172. The plunger 177 is normally held at the right by a spring 179. Thus the plunger 177 is a one-way or check valve. When it is forced away from a seat 180 by the pressure of the gas in the passage 175, the gas can pass through a passage 181 and pressurize the diaphragm 170. This moves the diaphragm 170 to the left in FIG. 9 and holds it there.

A passage 182, however, leads to a needle valve 183 (FIG. 6). The needle valve 183 has a handle 184 that moves a needle stem 185 toward and away from a seat 186, whence the gas is bled away to the atmosphere. By controlling the bleed rate at the needle valve 183, the recovery of the diaphragm 170 by the spring is controlled, and the time it takes to bleed off the gas, forcing the diaphragm to the right, is the maximum time that the valve 60 will remain off. It can, of course, be actuated more quickly by the patient's exerting whatever effort is then required to time the valve 60 himself. But if he does not breathe before the automatic timer 120 acts, it will time his expiratory phase duration for him. This very accurate timer is usually employed over a range of 0.5 to 15 seconds, giving breathing rates from 0 to 100 breaths per minute. The needle valve 185 has a calibrated flat ring 188 like needle valve 42 for setting respiratory pattern.

This timer 120 does not, thus, ordinarily take the timing away from the patient; but it will do so if he does not breathe at the correct time. Note also that the timing begins at the end of inspiration; so long as the patient is breathing in, the timing will not begin. It provides a time limitation on the exhalation phase, an insurance that the exhalation time will end at least by a definite time, if not before then. In resuscitation work, this acts automatically without overriding any patient who is breathing. No manual valve need be tripped to do this.

This timer 120 serves to send air into the patient's lungs if he does not take it up within a certain time determined by the bleed-off, but if he does take in air independently, then it will not affect him, and he will be on his own. He is given reserve support but is not given a push. There has been some trouble in prior-art devices with the patient's being forced to take air at times when he shouldn't have, and this invention overcomes that problem.

*Manual operation of the valve 60 (FIGS. 3, 5, and 9)*

For manual operation or hand timing of the valve 60, a novel hand-operated plunger 190 with a handle 191 is provided. The plunger 190 is a shaft that extends right through the tubular shaft 97. Another shaft 192 extends through the hollow main shaft 61, being held to it securely by a nut 193 that is tightened against the attraction plate 75 (FIG. 5). The shaft 192 extends through the diaphragm 66 and plates 67 and 68 and the attraction plate 95 and terminates in a ball 194. The end of the plunger shaft 190 is then secured (as by crimping) to the ball 194, and the shaft 192 has an enlargement 195 bearing against the plate 95, so that, in effect, the shafts 190 and 192 are a single shaft secured to the main valve 60 and all forces from the shafts 190 against the main valve 60 are therefore exerted centrally and evenly. This is important, for the offset adjustment previously in use tended, when handled carelessly, to break the ceramic valve shaft 61, whereas the present plunger 190, 192 cannot do so.

The valve 60 may thus be manually opened by pushing on the plunger handle 191 to move the valve 60 and both armatures 75 and 95 to the right, and the valve 60 may be manually closed by pulling on the plunger handle 191, to move the valve 60 and both armatures 75 and 95 to the left. Operation is certain, is immediately responsive, and is well balanced.

The hand-timer 190 is used in pre-setting pressures, in manually pacing the patient's breathing, and to lengthen the inspiratory phase and thereby determine the pressure needed to produce the desired chest excursion. Thus, by watching the gauge 160 during hand operation, it becomes a simple matter to set the handles 83, 100, 204 and 48 for proper values. At any time this hand timer can be used to override both spontaneous and auto-timer 120 signals.

*The negative pressure interrupter switch 125 (FIGS. 5, 6, 9 and 11)*

An important feature of the present invention is the provision of a device that supplies a jet of gas to a venturi 200 in the beathing head assembly 23 during the negative (i.e., inspiration) phase, and cuts off this supply during the positive (i.e., expiration) phase. While the complete operation must, of necessity, be explained later, the negative pressure switch 125 and flow generator system will be described now.

The inlet opening 40 is connected by the passage 43 to a passage 201, which is connected to or separated from a passage 202 by a needle valve 203 having a handle 204 enabling any exact setting that may be desired. Thus gas at the inlet pressure but at any desired metered rate of flow passes into the passage 202 (FIG. 11). The passage 202 ends in a fitting 205 to which a flexible conduit 206 is connected, and the conduit 206 terminates at a fitting 207 in a body member 208 of the negative pressure unit 125. A calibrated ring 209 is provided, calibrated with the same numbers as those on the segment 82, ring 102, and ring 52, for simultaneous use therewith.

The interrupter switch 125 has a cap 210 that is threaded to the body 208 and a diaphragm 211 is clamped between them, there being a chamber 212 on the lefthand side (FIG. 11) and a chamber 213 on the righthand side of the diaphragm 211. The chamber 212 is connected by a passage 214 to the conduit 123, which, it will be recalled, is connected at all times directly to the downstream side of the valve 60, i.e., to the gas that has passed through the valve 60, via the passages 121 and 114. The chamber 213 is vented to the atmosphere by a vent 215 (the interior of the chamber 34 always being at atmospheric pressure). A spring 216 biases the diaphragm 211 to the left (FIG. 11) so that the diaphragm 211 moves to the left as soon as the valve 60 is closed and moves to the right as soon as the valve 60 is opened. Gas from the chamber 212 dumps through the nebulizer 280.

A valve member 217 is mounted slidably in an axial passage 218 of the valve body 208. It has a stem 220 that extends through the spring 216 and a head 221 against which the spring 216 bears. The passage 218 is connected to the fitting 207 by a passage 222, and leads to a narrower axial passage 223 by way of a valve seat 224. When the diaphragm 211 and valve 217 move to the left, the valve 217 is moved away from the valve seat 224, and gas then flows from the inlet passage 40 through the passages 43 and 201, the needle valve 203, the passage 202, the conduit 206 and passages 222 and 218 into the passage 223. This is during the negative (expiratory) phase. During the positive (inspiratory) phase, the valve 217 is closed and shuts off the flow of gas by moving against the seat 224.

The passage 223 is connected by a passage 225 through the body 30 to a fitting 226, whence the small conduit 25 leads to the venturi 200 in the breathing head 23.

*The breather head assembly 23 (FIGS. 1 and 15)*

The large conduit 26 conducts the main current of oxygen, oxygen-enriched air, or air, from the control assembly 20 to the breather head assembly 23. More specifically, it conducts gas from the reservoir 33 to a lower T 230, where it enters through a central passage 231. To the upper branch 232 of the T 230 is secured the central branch 233 of an upper T 234. From there the gas passes through the left branch 235 of the upper T 234 directly to a mouthpiece 236 or to a face mask if desired. Thus the main gas flow is direct and unimpeded between the reservoir 33 to the mouthpiece 236, and therefore any peak inhalation can be accommodated by the gas present in the reservoir 33 and conduit 25.

While a mouthpiece 236 is illustrated, the head assembly 23 may as easily be connected to an endotracheal tube, to an airway, to a tracheotomy adapter, or to a face mask.

The exhalation arrangement is quite different than in the co-pending patent application Serial No. 715,321, now Patent No. 3,068,856 and is believed to represent a most important advance in the art. In this invention a second venturi 200 is provided, mounted in the upper T 234 and having its lower end 237 seated snugly against the wall of the lower branch 238 of the lower T 230, so that the interior of the T 230 and the conduit 26 are effectively blocked off from an opening 240 at the lower end of the T 230. The exhalation gases therefore pass from the patient through the mouthpiece 236 through passages 241 into the venturi tube 200 and thence down and out only through the tube 200. Moreover, the conduit 25 connects the outlet fitting 226 from the negative pressure unit 125 to a jet nozzle 242 at the upper end of the venturi 200. As noted before, the conduit 25 supplies a metered flow of oxygen to the nozzle 242 only during expiration, and at this time it has several important functions—the complete scavenging of exhaled gases, so that the patient does not rebreathe his own exhalation or even part of it diluting the fresh air or oxygen, assistance in opening an exhalation valve 245, and others to be explained soon. Expiratory flow gradients below atmospheric pressure are therefore controllable. Thus, it can be seen that the jet nozzle 242 in combination with the venturi 200 forms aspirator means for establishing a negative pressure in the breathing head assembly 23 or in other words a subambient or below atmospheric pressure in the breathing head assembly 23.

*The exhalation valve 245 (FIGS. 15 and 16)*

The exhalation valve 245 is of the mushroom type, normally being held seated against a seat 246 on the lower end of the lower branch 238 of the lower T 230. Exhalation forces the valve 245 away from the seat 246. Then all the exhaled air flows out through a passage 247 in a large tubular projection 248. For normal operation the outer end of the projection 248 may be left open, but if desired, and as illustrated herein, control may be obtained by using a retard cap 250 having, as shown in FIG. 16, a plurality of openings 251, 252, 253, etc. of different sizes, any of which can be aligned with an opening 255 in the projection 248. An eyelet 256 on the retard cap 250 and an eyelet 257 on the T 230 secure a string 258 which keeps the retard cap 250 from getting lost when it is not in use. By adjusting any of the given sizes of openings 251, 252, 253, etc. relative to the opening 255, any given retard rate or back pressure can be built up. A positive expiratory pressure against expiratory effort can thereby be developed and adjusted to combat bronchiolar collapse, reduce turbulence, increase the mixing and distribution of bronchodilator aerosols, impede venous return in congestive heart failure, and reduce the effect of the anxiety precipitating the hyperventilation syndrome.

The valve 245 is of novel construction and is novel in effect. For one thing it can be assembled entirely from one end (the lower end) of the assembly 23 and the parts can practically be thrown in, so that when it is taken apart by a nurse for cleaning, it is readily reassembled. Furthermore, the parts are specially designed to prevent sticking even when the patient expels mucous or other matter when he exhales.

The valve 245 has a novel closure member 260 with an imperforate end wall 261 having a peculiar shape, including a central curved upper end 259. When the valve 245 is installed, the assembly 23 is inverted and the member 260 simply dropped in. Being bottom heavy and having the rounded bottom, it automatically adjusts itself to the right position, a very important fact since it is usually reinstalled by nurses or others having scant mechanical ability. The member 260 has an outer annular cylindrical flange 262 and a smaller annular concentric wall 263 providing a cylindrical receptacle 264 for a square separate valve stem 265. The line-contact during movement of the square stem 265 in the cylindrical receptacle 264 is one factor that helps to prevent the valve 245 from sticking.

A lower, cylindrical portion 269 of the square stem 265 extends through an opening 266 in a web 267 of a diaphragm-supporting member 268, which, in turn, is slidably mounted in a housing 270, preferably comprising an integral portion of the lower branch 238 of the T 230.

A lower cap 271 is threaded into the housing 270, and a diaphragm 272 is clamped between the cap 271 and the member 268, to provide an upper diaphragm chamber 273 and a lower diaphragm chamber 274. A passage 275 extending axially through the cap 271 connects the chamber 274 to a transverse passage 276. The passage 276 extends between two fittings 277 and 278. The fitting 277 is connected directly to the small duct 24 carrying gas from a point downstream of the main valve 60. The fitting 278 is connected by a conduit 279 to a nebulizer 280, which may be like that shown in co-pending application Serial No. 715,321, delivering airborne one-to-four micron particles of liquid about 0.2 second ahead of the inspiratory air and only on the inspiratory phase. The gas from the nebulizer 280 goes by the passage 281 to the mouthpiece 236. A bleed valve 282 may be provided in the cap 271 to enable regulation of flow there.

The square stem 265 and its cylindrical lower end 269 are the upper parts of a diaphragm-actuated stem 283, around which is a spring 284 that bears at one end through the stem 283 on the diaphragm 272 and bears at the other end on the web 267. Above the web 267 is a second spring 285 that bears on the web 267 and on the valve closure member 260, around the outside of the sleeve 263. A cylindrical flange 286 projects up from the member 268, midway between the flanges 262 and 263, thereby preventing binding with either of them, and these flanges 262, 263, and 286 all act together to protect the springs, items, and other internal parts from sticky foreign matter.

Thus, the nebulizer air stream from the duct 24 keeps the valve 245 positively closed during the inspiratory phase, but is turned off during the negative expiratory phase, when the duct 25 is conducting scavenging air under pressure to the jet 242. The spring 285 urges the valve closure member 260 to its normally closed position with a relatively light pressure, easily overcome by exhalation. However, the mean positive expiratory pressure is adjustable by rotating the retarder sleeve 250 to vary the size of outlet opening provided by registration or partial covering of the opening 250 (FIG. 15) in the body sleeve 248. This is important in many cases, to assure thorough mixing and diffusion of medication in the lungs. In contrast with apparatus relying on springs to increase the pressure on the exhalation valve, this retarder sleeve 250 acts by reducing the outlet area available; so as exhalation slows down toward the end, the back pressure is decreased by the outflow overbalancing the exhalation. The retarder may easily be adjusted to secure the exact exhalation rate desired. Expectoration may be induced with the aid of detergent medicaments, since the airways are kept open by the positive expiratory pressure as the bronchi shorten.

The gas in the small conduit 24 builds up pressure in the chamber 274 during inspiration to push the stem 283 up and thereby help keep the valve 260 closed, even while the pressure in the T 230 is increased by the flow of gas under pressure. Without such a pressure operation, the increased pressure would overcome the spring 285 and open the valve 245, but this cannot happen because of the pressure bias.

The needle valve 282 (FIG. 15) controls the bleed rate from the chamber 274, thereby partially controlling the time it takes the valve 245 to open after inspiration stops. So both time delay and a positive expiratory pressure can be obtained by use of the sleeve 250 and needle valve 282. In many cases the needle valve 282 will be fully closed; in others, it may be opened and adjusted to balance the exhalation valve on a feather edge to give extremely rapid dumping of lung gases without substantial expiratory delay.

As has been briefly noted before, the exhalation valve 245 is designed so that all its internal parts may be loaded from one end, in a way which prevents error or loss of parts. One side-outlet tube 248 collects all the expired gases, rather than having them go out to the atmosphere through several independent openings. This means that the gases can be collected for study if desired, as for a partial-pressure analysis or to drive a recording spirometer that measures tidal volumes. The engagement of the square stem 265 in the cylindrical cavity 264 involves only four line contacts and thereby prevents liquid surface tension, while the overlapping skirts 262, 286, and 263 eliminate accumulation of fluids around the stem 265. There are no exposed rubber parts to deteriorate, and the valve 245 is readily disassembled for cleaning. Also, the one-way flow prevents contamination of its parts during operation.

It may be mentioned that as a matter of convenience, the end wall 98 may be used to support a bracket 290, comprising a hooked stiff wire 291 covered with a soft material that prevents scratches. A screw 293 passing through an eyelet 294 may hold the bracket 290 to the wall 98. The bracket 290 (FIGS. 3 and 4) is used to support the breathing head assembly 23 when the assembly 23 is not being used.

Importance of the two venturis 130 and 200

Thus, the respirator of this invention utilizes two venturis: the venturi 130 in the control assembly 20 and the venturi 200 in the breather head assembly 23. In addition to its already-noted functions, the venturi 130 acts as a safety valve. If an obstruction should occur during expiration or any part of the negative phase, the plug 150 will open under a predetermined pressure differential to admit ambient air at atmospheric pressure from the chamber 34 to the conduit 26. It then also acts as a buffering means to smooth out the pressure flow curve and eliminate surges, and it helps to keep the breathing conduit 26 flushed by flowing ambient air during a portion of the expiration period from the chamber 34 through the conduit 26 and the valve 145 to the atmosphere.

The performance of the venturi 200 inside the breathing head assembly 23 is controlled by regulating the gas that passes through its centrally located jet 242, this being done by turning the needle valve handle 204. The effect of changing the gas flow through the jet 242 in the venturi 200 is to change the time it takes for the interior of the venturi 200 to reach a certain negative pressure. At the same time the venturi 200 acts as a pneumatic clutch affording slippage between back pressures and the flow changes, thereby affording resistance to the flow changes. Thus, it also smooths off the pressure curve and eliminates surges.

The preferred location of the venturi 200 inside the T 230 immediately at the expiration valve 245 is very important, because it channels the gases exhaled by the patient directly to the atmosphere through the valve 245, so that the exhaled gases do not contaminate the breathing conduit 26. The venturi 200 draws in air from inside the mouthpiece and assembly and thus helps to keep the mouthpiece 236 and the whole breather head assembly 23 and the lines adjacent thereto flushed clean of exhaled air. Moreover, the space taken up by the venturi 200 in the breather head assembly 23 reduces the amount of dead space within the assembly 23 to a minimum, so that the likelihood of rebreathing used gases is further diminished. The flow of ambient air from the respirator 20 down the breathing tube 26 further dilutes with fresh air the gases exhaled by the patient, and so still further reduces the effective so-called dead space in the breathing head assembly 23. This dilution accomplished by the mechanical mixing and diffusing of the gases in the breather head assembly 23 results in the initial portion of the next breath taken by the patient being freer of the end alveolar gases. In this way a still further reduction in carbon dioxide is achieved.

Another important feature is that the venturi 200 supplies a positive pressure gradient that helps the patient to open the gate 260 of the exhalation valve 245, this pressure coming from the upstream side of the venturi 200, thereby assisting the patient to obtain rapid and back-pressure-free expiration. At the same time, the interrupter switch or negative pressure unit 125 assures that the negative phase will not function during inspiration, for as soon as the patient breathes in air, the valve 60 closes and the diaphragm 211 snaps the valve 217 closed.

The negative pressure adjustments of the expiratory phase afforded by this invention enables greater augmentation of venous return for shock, inducement of cough stimulation and cough assistance, and facilitation of bronchial drainage.

*The inspiratory flow rate accelerator 300*
*(FIGS. 13 and 14)*

The invention also includes a novel accelerator unit 300 which automatically causes the respirator to overcome leaks at the breathing head 23 or elsewhere and to do so while still filling the lungs and achieving the prescribed peak positive pressure setting, the respirator valve 60 cutting off only when the positive pressure limit is reached, and therefore after the volume demanded by the patient has been satisfied. Previously, timing devices have been used on the inspiratory phase of respirators to cut off the flow of air after a predetermined time interval. While this does provide for cycling and means that the respirator will not continue to supply gas indefinitely should there be leaks, it does not help the patient much, because it provides no assurance that the patient will get enough air. For example, if the mouthpiece 236 is loose or if some hole has developed in the breathing tube 26, the patient is simply deprived by such timing devices of a certain portion of his air in order for the time cycle to take effect, so that the greater the leak, the less air the patient gets. These prior-art devices do not accomplish the mission of ventilating the lung but merely make a mechanical on-off device out of the respirator without increasing the flow to compensate for leakage. Yet, the primary object of a respirator is to satisfy the needs of the patient for air or oxygen. The present invention accomplishes this object by providing the accelerator mechanism 300 which, when there is a leak, gradually increases the flow rate through the conduit 26 to compensate for the leak; therefore, the leakage is compensated by supplying more air to the patient. The respirator valve 60 still switches off when it reaches its limiting pressure; this operation cannot be duplicated by a mechanical timing device.

Of course, the inspiratory flow rate can be set by the valve 42 to offer regular and known compensatory adjustment for such variable factors as pulmonary compliance, airway resistance, lung capacity and size, and the respiratory rate. Low or normal flows allow enough inspiratory time to increase tidal exchange. Even limited leaks in the mask, tracheotomy fittings, and so on, up to a value of leakage corresponding to an 8 mm. orifice can be handled by the valve 42, if known in advance. What is meant here is compensation for unforeseen or unknown leaks and in rather gross amounts.

The accelerator 300, shown in FIGS. 13 and 14, is a novel device that is mounted on the case member 32 in atmospheric-pressure compartment 34 and is connected to a novel input fitting 301 for the venturi 130, being substituted at that point for the simple jet 138 heretofore described. The oxygen from the tube 129 still flows into the fitting 301, going through a jet passage 302, which provides the jet action just as the jet 138 did before, but there is also a second set of jets 303 comprising one, two, or more smaller openings spaced around the central jet 302 and leading from an annular manifold chamber 34. These additional openings 303 afford additional oxygen to increase the flow through the venturi tube 140 in the event of leakage from the tube 26 or at the breather head assembly 23.

The flow-accelerator device 300 comprises a main body 305 having a radial inlet opening 306 which is connected by a conduit 307 through a metering valve 308 and a conduit 309 to the oxygen inlet passage 40. Thus, oxygen under pressure passes through the metering valve 308, which is hand set to give any desired value or can be set at the factory, and goes into the inlet 306 of the accelerator 300. The accelerator 300 is axially bored to provide a passage 310 in which a piston-type valve member 311 moves and to which leads a bleed passage 312 vented directly to the atmospheric air within the chamber 34. The open end of the body 305 is closed by a cap 313, which is threaded into the body 305 and acts to clamp and hold a diaphragm 314 that thereby divides the interior into a chamber 315 on its left (as shown in FIGS. 13 and 14) and a chamber 316 on the right.

The right chamber 316 is connected by a passage 317 and a conduit 318 to the main downstream passage 114. The left chamber 315 is vented to the atmosphere within the chamber 34 by a passage 320. A spring 321 engages an enlarged flange 322 on the sliding valve member 311 and holds it against the diaphragm 314, thereby urging the diaphragm 314 normally to the right, so that the diaphragm 314 moves to the left only when there is pressure on the downstream side; in other words, when the valve 60 is in its open position. Thus, FIG. 13 shows the device 300 with its diaphragm 314 moved to the right in the position where the valve 60 is closed, while FIG. 14 shows the device 300 with the diaphragm 314 moved to the left, as it is when the valve 60 is open.

The valve member 311 is provided with three O-rings 323, which act to prevent leakage around the valve piston 311, and is bored to provide an axial passage 324 and a short radial passage 325. In the closed position of the valve (FIG. 13) the radial passage 325 does not connect with anything, and this means that a small chamber 326 to the left of the piston 311 is at atmospheric pressure. When the diaphragm 314 is moved to the left by downstream pressure, the valve piston 311 is moved to the left, and the passage 326 is thereby connected to the oxygen inlet passage 306 by the passages 324 and 325, the gas entering at a rate metered by the valve 308. The gas passes from the chamber 326 through a passage 327 into a cylinder 328 containing a piston 330 having an O-ring seal 331 and biased to the right by a spring 332. The piston 330 is connected to or integral with a stem 333 having a tapered projecting valve nose 334 which is moved against or away from a valve seat 335 by movement of the piston 330 or can be moved away from it. When closed, the valve 334 separates a passage 336 on its right side (as shown in FIGS. 13 and 14) from a passage 337 on its left side. Into the right passage 336 comes an inlet 340 connected directly to the main inlet passage 40, a conduit 341 leading oxygen directly and at full pressure from the source 22 and the inlet 21 to the inlet 340. The left passage 337 is connected to an outlet passage 342 which, and when the valve 334 is gradually opened, sends gas at a steadily accelerated rate via a conduit 343 to the fitting 301 whence it passes by the manifold 304 and jets 303 into the venturi tube 140. The valve 308 has a calibrated ring 308a that is calibrated like the segment 82, ring 102, etc., to give proper adjustment.

The metering valve 308 limits the rate at which gas can pass into the chamber 326 and cylinder 328 during each inspiratory phase and thereby times the interval needed to move the piston 330 and open the valve 334. Usually this time is set so that if there is no leakage from the tube 26 or mouthpiece 336, the piston 330 is never moved to the left and therefore the valve 334 is never opened. However, if there is a leak in the conduit 26 or in the breather head assembly 23 or at the patient's mask, then the pressure that has to be reached in order to turn the respirator valve 60 off is not reached in the normal time, and the pressure against the piston 330 then builds up until it is high enough to slowly move the piston 330 to the left, opening the valve 334 gradually, sending gas into the venturi jets 303 on a predetermined acceleration curve and thereby drawing in steadily increasing amounts of air from the chamber 34 and sending it through the conduit 26 to the mouthpiece 336. The air pressure increases steadily, but gradually rather than as a shock, due to the operation of the accelerator 300 as described, but it does act immediately to supply an amount of gas needed to achieve the cutoff positive pressure limit setting of the respirator on inspiration.

Therefore, the flow accelerator device 300 in combination with the already-described part of the respirator 20, achieves a bi-phasical flow pattern. During the expiratory phase, the airways of the lung are narrower than during the inspiratory phase, and as the lung gradually fills the cross-sectional areas of the airways increase their diameters and therefore accept an accelerated flow rate without developing undue turbulence. Initially, the normal flow pattern would gradually increase the lumen of the airways and then, as the accelerator device 300 increases the flow, the airways of the lung are prepared to receive the larger flow. Note that with increased pressures, increased leakage may take place, but the accelerator 300 is designed to steadily increase the flow until the inspiratory pressure limit settings are achieved. At the same time, the accelerator 300 also does the job that the mechanical inspiratory timers did, because the accelerator 300 may be set to act at any point during inspiration, guaranteeing a tidal volume equal to the compliance and resistance existing in the lung over the pressure-flow curve. The increased flow obtained by the accelerator 300 occurs through the auxiliary jets 303 and across the venturi tube 140 so that the resulting flows to the patient are smooth, and the same slippage and air-clutch-effect against obstruction are maintained. Therefore, the accelerated flow is soft and not noticeable at first, blending gradually into the pressure-flow curve to create a secondary portion of that curve that is well integrated with the primary portion.

The accelerator 300 also enables ventilation of large animals without additional modification of the respirator 20, since the needed increase in air is necessarily obtained by the accelerator 300. Moreover, the gas supply is conserved by mixing atmospheric air through the venturi tube 140 while still maintaining pulmonary conformance.

*Operation*

Gas from any suitable pressure source 22 enters the inlet fitting 21, whence it flows through the filter 39 and passages 40 and 41, to the flow-control needle valve 42. At the same time, it is flowing through the passage 43 to the needle valve 204, and, where the accelerator 300 is used, through the passage 309 to the needle valve 308 and through the conduit 341 and passage 340 to the upstream side of the accelerator valve 334. The needle valve 42 meters the main flow to the desired constant flow rate, and the needle valves 204 and 308 also meter flow. From the valve 42 the oxygen flows through the passage 55 into the annular chamber 56 and radial passages 63 to the valve 60. As the valve 60 is closed, it goes no further, and as a result the accelerator device 300 also remains closed, its diaphragm 314 being biased to the closed position. However, the negative unit 125 is on, as will be explained later.

The valve 60 is switched on by any of: (1) reduction of pressure in the reservoir 33, which may be caused by the effort of the patient to breathe, (2) movement of the magnet 76 to the left where it overbalances the pressure on the diaphragm 66, (3) movement of the magnet 96 to the left to where its force is reduced, (4) movement of the arm 165 to the right against the armature 95, by the bleeding off of the pneumatic timer 120, or (5) manual movement of the plunger 190 to the right. The valve 60 is switched off by any of the following: (1) an increase in pressure in the reservoir 33, which may be caused by a patient starting to exhale or ceasing to inhale, (2) movement of the magnet 76 to the right, reducing its pull relative to the force on the diaphragm 66, (3) movement of the magnet 96 to the right far enough, or (4) manual retraction of the plunger 190.

In normal operation, incipient inhalation of the patient switches the valve 60 on, and incipient exhalation switches the valve 60 off, the magnet 76 being positioned to determine the patient effort that turns the valve 60 off while the magnet 96 is adjusted to determine the patient effort needed to turn the valve 60 on or to determine the rate of timing where automatic (no patient effort) timing is employed. The pneumatic timer 120 gives an overriding control, taking over from the patient if his breathing rate drops below a predetermined level. The accelerator device 300 supplies oxygen-enriched air to make up for deficiencies resulting from leaks, to assure that the patient gets enough air, while still providing for the cutoff at the same pressure values as before.

When the valve 60 is moved to its on position, the high-pressure gas flows to the downstream bore 106 and from there to the passage 114. Depending upon the position of the air switch 107, the oxygen will either flow directly into the chamber 33 by way of the passage 126 and reed 127 or else will flow through the conduit 129 to the venturi 130. In any event, when the valve 60 is open, oxygen passes to the small conduit 24 directly from the passage 114, going to the breather head assembly 23 to close the exhalation valve 145 and also going into the nebulizer 280. Gas, whether pure oxygen or oxygen diluted with air, passes from the chamber 33 through the conduit 26 to the breathing head assembly 23, and (properly nebulized, if desired) goes to the patient.

Meanwhile, gas from the passage 114 passes by the conduit 123 to the negative pressure unit 125, pressurizing its diaphragm 211 and moving its valve 217 to its closed position, so that there will be no passage of gas downstream through the conduit 25 so long as the positive phase is going. The patient inhales so and, if there is any leakage, the gas flow is after a short time supplemented by the device 300, since the downstream pressure through the conduit 318 pressurizes the diaphragm 314 and therefore slides the piston valve 311 to the left, connecting the passages 324 and 325 to the metering valve 308, thereby moving the piston 330 to the left as soon as pressure has had time to build up sufficiently. Then the valve 334 moves to the left and sends oxygen from the inlet 40 to the venturi jets 303, picking up additional atmospheric air and compensating fully for the leak.

When the patient's lugs are filled, back pressure through the conduit 26 and reservoir 33 moves the diaphragm 66 to the left and moves the valve 60 to its "off" position where it is held by the magnet 96. At this stage the venturi 130 is shut off by closure of the check valve 150 on its outlet end, and the reed 127 acts as a check valve for the passage 126, in case pure oxygen is being used. Instantaneously, the chamber 275 dumps, releasing the piston 269, and breathing pressure opens the exhalation valve 245 against its spring. This action is supplemented by the fact that as soon as the valve 60 is closed, pressure bleeds off from the diaphragm 211, opening the valve 217 and therefore sending air through the conduit 25 to the venturi jet 242 and therefore to the venturi 200, aiding in opening the exhalation valve 245 by this additional pressure. At the same time, as soon as the valve 245 opens, the gas to the venturi 200 sucks in the exhaled air and helps to scavenge the hose 26 and mouthpiece 236. As negative pressure is generated, the venturi valve 150 will open and send atmospheric air to further flush out the hose 26. The exhalation continues until one of the factors already mentioned opens the valve 60 again.

The new respirator carefully relates the functions of inspiratory pressure limit, inspiratory flow rate, inspiratory sensitivity effort, negative pressure limit, expiratory flow rate, and expiratory time to a novel indexing arrangement. As noted before, calibrations are provided on the ring 82 for use with the magnet 76, on the ring 102 for use with the magnet 96, and on the ring 52 for use with the valve 42, and these calibrations are made in matching figures. By setting these all at the same figures, e.g., "15," flow patterns are permanently established on the respirator 20. The operator skilled or unskilled may obtain the greatest possible ventillatory and bronchial benefit for the patient.

Control of inspiratory and expiratory times independently from each other enables the setting of a wide variety of inspiratory-expiratory time ratios. Control of the expiratory time independently of the inspiratory effort sensitivity enables the setting of a minimum respiratory-controlled rate, with an escape to assistance of a spontaneous respiration, should the controlled rate be exceeded by spontaneous effort. Moreover, the control over each of inspiratory pressure, expiratory pressure, flow rates, sensitivity and times, makes it possible to create almost any desired controlled respiratory pattern and gives the device the ability to follow any existing respiratory pattern.

When the hand timer 190 is used, it is used without any damage to the ceramic shaft 61, and this is a very important feature, due to the central location of the plunger 190 through the hollow shaft 61.

*Use of the respirator as a cardiac resuscitator*

The new device may be used as a cardiac resuscitator as follows. A cuffed endotracheal tube is inserted into the patient's airway, and his entire thoracic cage is splinted with a tight jacket so that the volumes of the thoracic cage are relatively fixed. The branch 235 of the head 23 is then connected by a suitable conduit to the endotracheal tube. The inspiratory phase progresses through a pressure range of from zero to 200 cm. of water. By this means, blood in the pulmonary circuit is forced over to the left side of the heart; it cannot flow to the right due to the tricuspid, the pulmonic, and the mitral valves. Gradually, as this blood is pushed over to the left side of the heart, the left ventricle is filled. Then, as the flow accelerator switch 300 gradually takes over, it rapidly squeezes the left ventricle and ejects its volume through the aortic valve into the aorta. This provides cardiac stroke volume.

As the respirator switches to the negative expiratory phase, a gradual negative pressure is developed, enhancing the return of venous bood back into the lung, again loading the pulmonary circuit with blood to follow through on the next cycle. This procedure can be maintained at a nominal rate approaching the normal cardiac time cycle.

*Simulating cough reflexes*

Another function of respirator is to simulate the normal cough reflex. This may be accomplished by filling the lung rapidly with a high positive pressure at an inspiratory phase and then in a period of one to two-tenths of a second, manually switching over to a negative expiratory phase. This raises the intra-airway pressure very rapidly and drops it very rapidly. While a check-valve type of collapse does occur in the peripheral airway, a cough reflex approaching that of normal becomes possible, airway pressures in coughs having been measured up to 160 and 200 mm. Hg in normal subjects. This cough reflex can be repeated a number of times to expel secretions or to get them moving into the upper airways where they can be aspirated or expectorated.

*Reducing airway traumatization and maintaining patency*

Another application of the flow accelerator is to reduce the amount of airway traumatization from frequent aspiration and to maintain their patency. For this purpose the endotracheal or tracheotomy tube cuff can be left partially deflated to leave a clearance so that, when a secretion has been worked upward due to parastoltic action and other cephalad drainage functions within the lung during the inspiratory and expiratory phases and reach the base of the cuff, they will be forced past the cuff up into the pharingeal areas, where they can easily be aspirated or masticated. Without the flow accelerator, the cuff (at a standard flow rate) might not allow the respirator to reach its pressure limit unless it is not fully inflated, and therefore an inspiratory switch-off would not occur and would leave the patient with a slight positive pressure held against the airway. This might lead to lethal consequences.

*Modified form of breather head assembly (FIG. 17)*

FIG. 17 shows a breather head assembly 350 which is generally like the assembly 23 except for the location of a venturi 351 *beyond* the exhalation valve 245 instead of ahead of it. The upper T 352 is like the upper T 234 except for the absence of the venturi adjacent to the mouthpiece 236. The tube 25 passes through an inlet 353 in the sleeve 248 to a venturi jet 354 located beyond the exhalation valve in a housing 355. Openings 356 through a spider 357 that supports the jet 354 afford passage for the exhaled gasses into the venturi 351. The retard sleeve 250 may be used over an opening 358, or the sleeve 250 may be left off.

Figure 15:
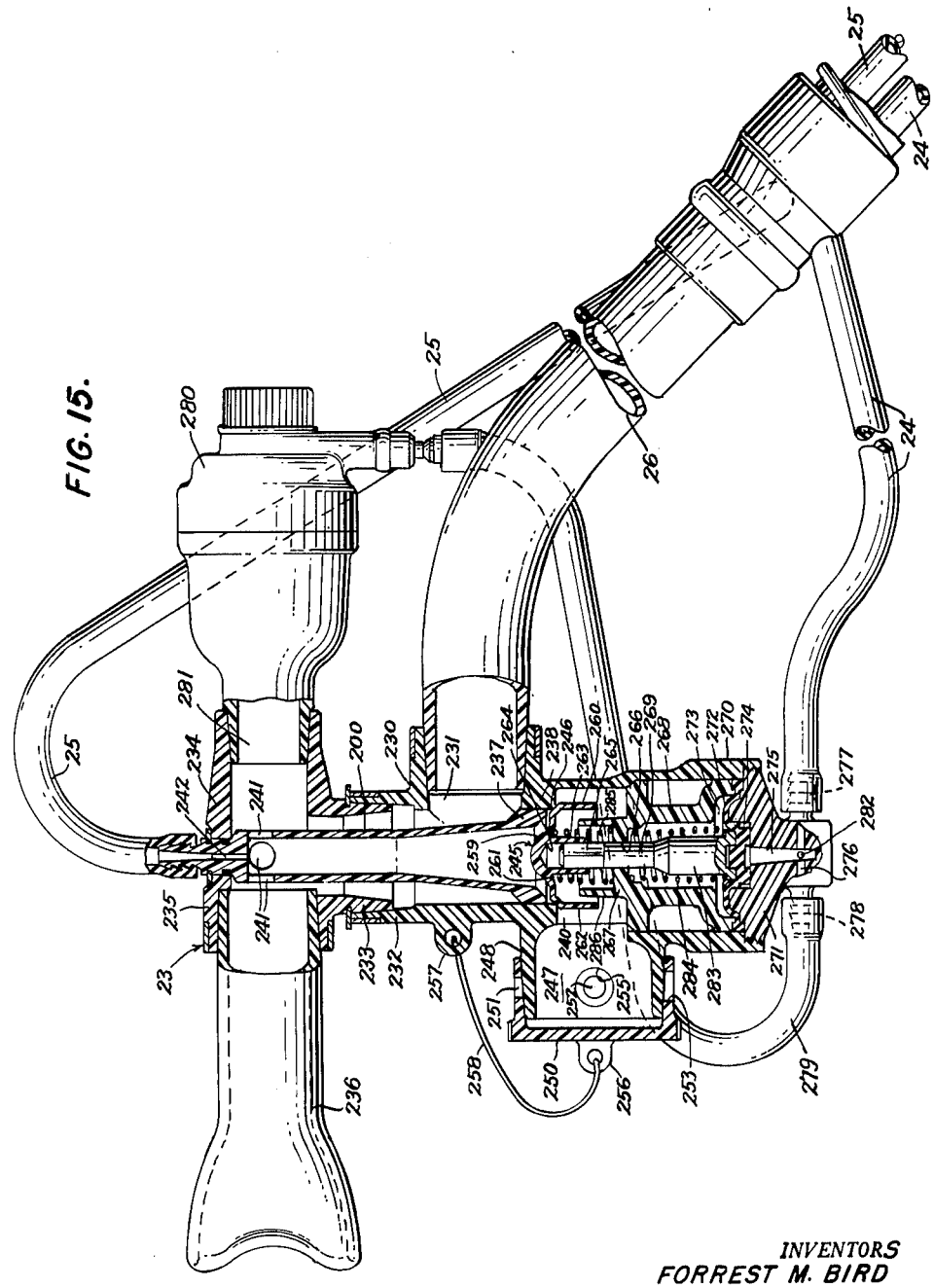
FIG. 15 is an enlarged view in side elevation and partly in section of the breather head assembly shown in FIG. 1.

Thus, in this embodiment, the venturi 351 helps to suck off the exhaled gases during the negative phase, and some assistance is given to the opening of the valve 245. However, the structure of FIG. 15 is preferred generally, as having less dead space and better locations of parts for quicker and more efficient action.

*Another modified form of breather head assembly 360 (FIG. 18)*

In FIG. 18 a venturi 361 is inserted between the lower T 230 and the exhalation valve 245. A jet 362 is positioned in the lower T 230 just above the venturi 361, and openings 363 are provided through the spider 364. This venturi 361 then draws in exhaled air through the openings 363 and therefore again performs the same general function of flushing the breathing head assembly 360 free from exhaled gases during the negative phase. This requires a somewhat larger assembly and involves somewhat more dead space but it is an effective alternative and can be used if desired.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a respiratory apparatus having a patient adapter and having an inhalation phase and an exhalation phase in its operative cycle, a body having a main passage adapted to be connected to the patient adapter and also having an inlet and an outlet communicating therewith, an exhalation valve mounted on said body biased to a normally closed position and serving to prevent the flow of gases through the outlet from the main passage, aspirator means in communication with said passage for establishing a reduced pressure in said passage in said body, said means including a jet nozzle, and means for supplying gas under pressure to said jet nozzle, said last named means including adjustable metering valve means for providing a metered flow of said gas, control valve means movable between open and closed positions for controlling the supply of metered gas to the jet nozzle, and means for operating the control valve means upon initiation of the exhalation phase to move the control valve means to an open position and to maintain the same in an open position only during the exhalation phase so that gas is discharged from the jet nozzle during the time the control valve means is open thereby to cause the aspirator means to establish a reduced pressure within the main passage of the body.

2. A respiratory apparatus as in claim 1 together with means for buffering the effect of the aspirator means while it is in operation, said buffering means including valve means for permitting additional gas to enter the main passage within the body.

3. A respiratory apparatus as in claim 1 wherein said jet nozzle is in alignment with said exhalation valve so that the gases passing from the jet nozzle impinge upon the exhalation valve to aid in opening the same.

4. In a respiratory apparatus having a patient adapter and having an inhalation phase and an exhalation phase in its operative cycle, a body having a main passage adapted to be connected to the patient adapter and also having an inlet and an outlet communicating therewith, an exhalation valve mounted on said body biased to a normally closed position and serving to prevent the flow of gases through the outlet from the main passage, aspirator means in communication with said passage for establishing a reduced pressure in said passage in said body, said means including a jet nozzle, and means for supplying gas under pressure to said jet nozzle, said last named means including control valve means movable between open and closed positions for controlling the supply of gas to the jet nozzle, and means for operating the control valve means upon initiation of the exhalation phase to move the control valve means to an open position and to maintain the same in an open position only during the exhalation phase so that gas is discharged from the jet nozzle during the time the control valve means is open thereby to cause the aspirator means to establish a reduced pressure within the main passage of the body.

5. A respiratory apparatus as in claim 4 wherein said last named means also includes a manually operated metering valve controlling the rate of flow of gas through said control valve means to said jet nozzle to thereby control the pressure reduction within the main passage of the body.

6. A respiratory apparatus as in claim 4 together with means for buffering the effect of the reduced pressure established by the aspirator means, said buffering means including valve means movable between open and closed positions, said last named valve means including means yieldably urging the same to a closed position, said last named valve means being operable at a predetermined pressure differential whereby said buffering means is normally operable during the exhalation phase to supply additional gas to said main passage.

7. A respiratory apparatus as in claim 4 wherein said means for operating the control valve means includes a chamber, a valve member disposed in the chamber, means yieldably urging the valve member into a position so that the control valve means is in an open position, means supplying a fluid to the chamber during the inhalation phase to shift the valve member into a position to close the control valve means, and means for exhausting said chamber upon initiation of the exhalation phase to permit the valve member to be shifted to a position to open the control valve means.

8. In a respiratory apparatus having an inhalation phase and an exhalation phase during its operative cycle, a controller having an inlet adapted to be connected to a source of gas under pressure, said controller having an outlet, main control valve means disposed in said controller and movable between open and closed positions to control the flow of gas through said passage from said inlet to said outlet, said main control valve means being in an open position during the inhalation phase of the respirator and in a closed position during the exhalation phase of the respiratory apparatus, a body having a main passage adapted to be connected to a patient adapter and also having an inlet and an outlet communicating therewith, means forming a flow passage connecting said inlet on said body to the outlet of said controller, an exhalation valve mounted on said body biased toward a normally closed position to prevent the flow of gases through the outlet of the body, aspirator means in communication with said main passage for establishing a reduced pressure in said main passage, said aspirator means including a jet nozzle, and means for supplying gas under pressure to said jet nozzle, said last named means including control valve means movable between open and closed positions for controlling the supply of gas to said jet nozzle and means for operating said control valve means to cause said control valve means to be moved to an open position upon initiation of the exhalation phase and to be retained in an open position only during the exhalation phase so that the gas discharged from the jet nozzle causes the aspirator means to establish a reduced pressure within the main passage of the body.

9. A respiratory apparatus as in claim 8 together with means for buffering the effect of the reduced pressure established by the aspirator means, said buffering means including valve means movable between open and closed positions, said last named valve means including means yieldably urging the same to a closed position, said last named valve means being operable at a predetermined pressure differential whereby said buffering means is normally operable during the exhalation phase to supply additional gas to said main passage.

10. A respiratory apparatus as in claim 8 wherein said control valve means includes metering means for adjusting the rate of flow of gas supplied to said jet nozzle.

11. In a respiratory apparatus having an inhalation phase and an exhalation phase in its operative cycle, a controller having an inlet adapted to be connected to a supply of gas under pressure said controller also having an outlet, main control valve means disposed in said controller and movable between open and closed positions to control the flow of gas from said inlet to said outlet, said main control valve means being in an open position during the inhalation phase of the respirator and in a closed position during the exhalation phase of the respirator, a breathing head, the breathing head having a main passage adapted to be connected to a patient adapter and also having an inlet and an outlet in communication therewith, an exhalation valve mounted on said breathing head and being biased to a normally closed position to prevent the flow of gases through the outlet of the breathing head, aspirator means mounted on said breathing head and having communication with the main passage in said breathing head, said aspirator means including a jet nozzle and means for supplying gas under pressure to said jet nozzle, said last named means including an anticipator valve movable between open and closed positions and means for controlling said anticipator valve upon the initiation of the exhalation phase to cause gas to be supplied to said jet nozzle upon this initiation of the exhalation phase and only during said exhalation phase.

12. In a breathing head assembly, a main body having a main passage adapted to be connected to the patient and also having an inlet and an outlet communicating therewith, an exhalation valve mounted on said body biased to a normally closed position and serving to prevent the flow of gases through the outlet from the main passage, said exhalation valve consisting of a valve body secured to said main body, the valve body being formed with a valve seating surface, a valve member slidably mounted in said body and movable between open and closed positions with respect to said seating surface, the valve member having outer and inner cylindrical concentric walls, the body having a first well facing toward the valve member and a second well facing away from the valve member, a valve stem disposed in the valve body, and extending through said first and second wells the stem being mounted in said first well and on said stem and engaging the valve member to yieldably urge the valve member toward a closed position, a diaphragm mounted in the valve body and secured to said valve stem, second spring means mounted in said second well and on said stem and engaging said diaphragm to yieldably urge the valve stem in a direction away from the valve member, and means for supplying gas to the side of the diaphragm opposite the combined spring means to yieldably urge the valve stem towards the valve member against the force of said combined spring means to reinforce the first spring means yieldably urging the valve member toward a closed position.

References Cited by the Examiner
UNITED STATES PATENTS

| | | | |
|---|---|---|---|
| 2,536,435 | 1/1951 | Fox | 128—29 |
| 2,881,757 | 4/1959 | Haverland | 128—29 |
| 2,996,071 | 8/1961 | Takaoka | 137—63 |
| 3,077,191 | 2/1963 | Stanton | 128—29 |
| 3,099,278 | 7/1963 | Keszler | 137—64 |

RICHARD A. GAUDET, *Primary Examiner.*